US008413163B2

(12) United States Patent
Hayashi

(10) Patent No.: US 8,413,163 B2

(45) Date of Patent: Apr. 2, 2013

(54) PROGRAM CONTROL DEVICE INCLUDING PER-TIMESLOT SWITCHING OF THREAD EXECUTION

(75) Inventor: Kunihiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1251 days.

(21) Appl. No.: 12/201,235

(22) Filed: Aug. 29, 2008

(65) Prior Publication Data

US 2009/0059951 A1 Mar. 5, 2009

(30) Foreign Application Priority Data

Sep. 3, 2007 (JP) ................................ 2007-228258

(51) Int. Cl.
*G06F 9/46* (2006.01)
*G06F 13/24* (2006.01)

(52) U.S. Cl. ......................... 718/108; 718/107; 710/260

(58) Field of Classification Search ........................ None
See application file for complete search history.

(56) References Cited

U.S. PATENT DOCUMENTS 5,768,599 A * 6/1998 Yokomizo ..................... 710/260
5,966,543 A * 10/1999 Hartner et al. ................ 710/200
6,675,191 B1 1/2004 Ito
6,684,342 B1 1/2004 Kelsey et al.
6,697,834 B1 2/2004 Dice
7,010,612 B1 3/2006 Si et al.
7,047,396 B1 5/2006 Fotland et al.
7,082,519 B2 7/2006 Kelsey et al.
7,120,783 B2 10/2006 Fotland et al.
7,200,846 B2 4/2007 Dice et al.
7,308,686 B1 12/2007 Fotland et al.
7,308,688 B2 12/2007 Sodhi
7,386,707 B2 6/2008 Kurata et al.
7,546,442 B1 6/2009 Fotland et al.
7,921,281 B2 4/2011 Kurata et al.
7,930,520 B2 4/2011 Kurata et al.
2002/0002667 A1 1/2002 Kelsey et al.
2002/0038416 A1 3/2002 Fotland et al.
2002/0044669 A1* 4/2002 Meyer et al. .................. 381/314
2002/0078121 A1* 6/2002 Ballantyne .................... 709/102
2003/0037228 A1 2/2003 Kelsey et al.
2003/0149864 A1 8/2003 Furukawa et al.
2004/0181791 A1 9/2004 Hayashi (Continued)

FOREIGN PATENT DOCUMENTS

JP 11-306149 11/1999
JP 2000-330807 11/2000

(Continued)

OTHER PUBLICATIONS

English language Abstract of JP 2003-271399 A.

(Continued)

*Primary Examiner* — Jennifer To

(74) *Attorney, Agent, or Firm* — Greenblum & Bernstein, P.L.C.

(57) ABSTRACT

Provided is a program control device which switches, per timeslot, between threads to be executed. The program control device includes: a first interrupt creation unit which creates a first interrupt signal which designates a timeslot as a destination; and a first receiving unit which [i] does not receive the first interrupt signal if the timeslot as the destination is not a current timeslot, and [ii] receives the first interrupt signal if the timeslot as the destination is the current timeslot.

21 Claims, 19 Drawing Sheets

U.S. PATENT DOCUMENTS

| | | | | |
|---|---|---|---|---|
| 2005/0044551 | A1 | 2/2005 | Sodhi | |
| 2005/0229179 | A1* | 10/2005 | Ballantyne | 718/100 |
| 2007/0050779 | A1 | 3/2007 | Hayashi | |
| 2008/0209162 | A1 | 8/2008 | Furukawa et al. | |
| 2008/0209192 | A1 | 8/2008 | Furukawa et al. | |
| 2008/0215858 | A1 | 9/2008 | Furukawa et al. | |

FOREIGN PATENT DOCUMENTS

| | | |
|---|---|---|
| JP | 2001-202258 | 7/2001 |
| JP | 2003-271399 | 9/2003 |
| JP | 2004-171167 | 6/2004 |
| JP | 2004-280297 | 10/2004 |
| JP | 2005-135382 | 5/2005 |
| JP | 3813930 B2 | 6/2006 |

OTHER PUBLICATIONS

Japan Office action, mail date is Jul. 12, 2011.

Takada et al., "Real-Time Operating System for Function Distributed Multiprocessors," Journal of Information Processing Society of Japan, vol. 47, No. 1, pp. 41-47 (2006), and an English language translation thereof.

* cited by examiner

PROGRAM CONTROL DEVICE INCLUDING PER-TIMESLOT SWITCHING OF THREAD EXECUTION

BACKGROUND OF THE INVENTION (1) Field of the Invention

The present invention relates to a program control device, namely an Operating System (OS), which switches between threads to be executed per timeslot.

(2) Description of the Related Art

Main functions of an OS are hardware management, thread management, data management, and input/output management. Among these managements, the thread management is for managing an order of executing threads, and is an important function of allowing a CPU, memories, input/output devices and the like to operate efficiently.

Here, the "thread" is a unit to be controlled (control unit), for managing a flow of startup, execution, and exit, and the like of a program.

A program operating under the management of an OS is treated as a thread, and every processing of the OS regarding execution of the program is performed in units of threads.

One of algorithms for deciding an order of executing threads is round-robin scheduling. In the round-robin scheduling, an execution time is allocated to a thread which is a control unit, and during the allocated execution time the thread has an execution permission of executing a program, but after the allocated execution time the execution permission is transferred to a different thread. Thereby, such an execution permission is allocated to each thread, equally and with a predetermined time period.

In real-time computing in which media processing is performed by a processor, it is necessary to perform various processing such as coding, decoding, and multiplexing at the same time. Therefore, in order to allocate the execution permission equally, each function for realizing the media processing is divided into threads, and the execution permission is allocated to each function. Thereby, the round-robin scheduling can be applied in the real-time computing.

However, the round-robin scheduling has a problem in responsiveness in the real-time computing, because once a thread loses an execution permission, a next execution permission is given after one cycle. Although the responsiveness is improved by reducing a duration of the cycle, the shorter the cycle is, the higher an overhead of switching execution permissions becomes. In order to solve the problem of the overhead of switching execution permissions, there is disclosed in Japanese Patent No. 3813930 a processor which saves and restores contexts by using hardware.

Moreover, when the above prior art is implemented by a multiprocessor, there is a problem of deciding to which processor a thread is to be allocated.

In symmetric multiprocessors, threads are allocated to processors dynamically at scheduling, so that system loads are distributed to a plurality of processors. Therefore, it is difficult to allocate an execution time per thread.

Therefore, it is necessary to fix processors when the processors are allocated per thread. It is known, from "Real-Time Operating System for Function Distributed Multiprocessors", Journal of Information Processing Society of Japan, Vol. 47, No. 1, 2006, to provide a real-time OS which decides processors to be allocated per thread and performs priority scheduling per processor.

However, in the above prior art, with the increase of the number of threads, the number of switching within one cycle that is a total period of all timeslots is increased, and a region in which contexts are managed is also increased. Therefore, it is difficult to ensure demanded performance for each thread.

In addition, in the multiprocessors, when a certain processor is directly allocated to each thread, description in the thread depends on the processor. Therefore, if a configuration of the multiprocessor is changed, the description in the thread needs to be changed. As a result, there is a problem of poor flexibility in thread designing.

In order to solve the above problems, the first object of the present invention is to provide a program control device which satisfies demanded performance of a plurality of threads. Furthermore, the second object of the present invention is to provide a program control device which ensures flexibility of program designing.

SUMMARY OF THE INVENTION

In accordance with an aspect of the present invention for achieving the above objects, there is provided a program control device which switches, per timeslot, between threads to be executed, the program control device including: an interrupt creation unit configured to create a first interrupt signal which designates a timeslot as a destination; and a receiving unit configured [i] not to receive the first interrupt signal if the timeslot as the destination is not a current timeslot, and [i] to receive the first interrupt signal if the timeslot as the destination is the current timeslot.

With the above structure, the program control device according to the present invention can prevent that an undesired interrupt process (interrupt handler) is not invoked in a timeslot which is not designated as a destination of the interrupt process. In other words, assuming that a timeslot during which a thread is executed is a single virtual processor, if such a virtual processor is not the destination of the first interrupt signal, the virtual processor does not receive the first interrupt signal in the above-described structure. Thereby, performance of the virtual processor which is not the destination is not interfered and deteriorated by the first interrupt signal. As a result, the program control device according to the present invention can ensure demanded performance of each thread.

Here, the program control device may further include: a storage unit in which [i] thread information regarding a thread and [ii] timeslot information regarding a timeslot are stored, [i] the thread information including an identifier of a timeslot to which the thread is allocated, and [ii] the timeslot information including information indicating a thread which is allocated to the timeslot; and, a specification unit configured to specify the timeslot as the destination of the first interrupt signal, based on the thread information and the timeslot information, wherein the interrupt creation unit is configured to create the first interrupt signal which designates as the destination the timeslot specified by the specification unit.

With the above structure, the destination of the first interrupt signal is decided based on the thread information and the timeslot information. Thereby, in designing program for each thread, it is not necessary to describe a processor which is to execute the thread nor a communication-destination thread for communication between the threads. As a result, the program control device according to the present embodiment can ensure flexibility of the program designing.

Furthermore, the program control device may further include: a receive processing unit configured to receive a system call from a current thread which is being executed in the current timeslot; and a scheduling unit configured to change one of state of a thread and state of a timeslot in response to the system call, the thread and the timeslot being among threads and timeslots including the current thread and the current timeslot, respectively, wherein the interrupt creation unit is configured when the scheduling unit changes the state of the thread, to create the first interrupt signal which designates as the destination a timeslot to which a thread relating to the change, the thread relating to the change being among threads including the thread with the state being changed by the scheduling unit, and when the scheduling unit changes the state of the timeslot, to create a second interrupt signal, and the program control device further includes: a first dispatch unit configured to switch between threads to be executed in the timeslot as the destination, in response to the first interrupt signal received by the receiving unit; and a second dispatch unit configured to change the timeslot information regarding a thread, in response to the second interrupt signal received by the receiving unit, the thread being among threads including the thread relating to the change.

With the above structure, based on a system call from each thread, it is possible to specify, for example, a processor having a timeslot to which a communication-destination thread of the thread is allocated. Thereby, the first dispatch unit is driven for the timeslot to which the communication-destination thread is allocated, using the first interrupt signal. As a result, the program control device according to the present invention can suppress deterioration of performance of the thread due to communication between threads.

Still further, the program control device may further include a timeslot switching unit configured to switch a timeslot to another timeslot, based on an allocation time allocated for the timeslot, wherein the timeslot switching unit is configured to [i] prohibit the receiving unit to receive the first interrupt signal and the second interrupt signal during the switching, and [ii] permit the receiving unit to receive the first interrupt signal and the second interrupt signal immediately after the switching.

With the above structure, switching between timeslots is performed prior to creation of the first interrupt signal, in other words, prior to execution in a timeslot. Thereby, a time period allocated to the timeslot is not deprived.

Still further, the program control device may be included in a multi-processor having a plurality of processors, the interrupt creation unit may be configured to create the first interrupt signal which designates [i] one of the plurality of processors and [ii] the timeslot as the destination, and the receiving unit may be configured [i] not to receive the first interrupt signal from the processor that is not the processor designated in the first interrupt signal, and [ii] to receive the first interrupt signal from the processor that is the processor designated in the first interrupt signal.

With the above structure, it is possible to prevent that an undesired interrupt process (interrupt handler) is not invoked for a processor which is not a destination of the first interrupt signal. As a result, the program control device according to the present invention can ensure processing performance of a thread in each timeslot of the processor which is not the destination.

Still further, the program control device may be included in a multi-processor having a plurality of processors, the interrupt creation unit, which is provided for each of the plurality of processors, may be configured to create the first interrupt signal which designates [i] one of the plurality of processors and [ii] the timeslot as the destination, and the receiving unit, which is provided for each of the plurality of processors, may be configured [i] not to receive the first interrupt signal, if the processor for which the receiving unit is provided is not the processor designated in the first interrupt signal, and [ii] to receive the first interrupt signal, if the processor for which the receiving unit is provided is the processor designated in the first interrupt signal, the program control device may further include: a thread information storage unit in which thread information for each of threads is stored, the thread information including [i] a state of a corresponding thread and [ii] an identifier of a timeslot to which the corresponding thread is allocated; a timeslot information storage unit in which timeslot information for each of timeslots is stored, the timeslot information including [i] an allocation time allocated for a corresponding timeslot, [ii] information designating a thread allocated to the corresponding timeslot, and [iii] an identifier of a processor to which the corresponding timeslot is allocated; a receive processing unit, which is included in each of the plurality of processors, configured to receive a system call from a current thread which is being executed in the current timeslot; and a scheduling unit, which is included in each of the plurality of processors, configured to change one of the thread information and the timeslot information, in response to the system call received by the receiving unit, wherein the interrupt creation unit includes: a first interrupt creation unit, which is included in each of the plurality of processors, configured to create the first interrupt signal which designates [i] a processor as a processor destination and [ii] the timeslot as the destination, when the scheduling unit in the processor including the first interrupt creation unit changes the thread information, and a second interrupt creation unit, which is included in each of the plurality of processors, configured to create a second interrupt signal which designates a processor as a processor designation, when the scheduling unit in the processor including the second interrupt creation unit changes the timeslot information.

With the above structure, the thread information and the timeslot information include information regarding a relationship between a timeslot and a processor to which a thread is allocated. Thereby, it is possible to dynamically allocate a thread to an arbitrary timeslot and an arbitrary processor. Therefore, it is not necessary to describe a processor which is to execute a thread in program designing for the thread. As a result, the program control device according to the present invention can ensure flexibility of the program designing.

Still further, the scheduling unit may be configured to specify a processor and a timeslot to each of which a thread with the thread information being changed by the scheduling unit is allocated, based on the identifier of the timeslot and the identifier of the processor, and the first interrupt creation unit may be configured to create the first interrupt signal which designates [i] the processor specified by the scheduling unit as the processor designation and [ii] the timeslot specified by the scheduling unit as the designation.

Still further, the receiving unit may be configured [i] not to receive the second interrupt signal, if the processor including the receiving unit is not the processor designated in the second interrupt signal, and [ii] to receive the second interrupt signal in a certain timeslot in each of the plurality of processors.

Still further, the program control device may further include: a timeslot switching unit, which is included in each of the plurality of processors, configured to switch a timeslot to another timeslot, based on an allocation time allocated for the timeslot; a first dispatch unit, which is included in each of the plurality of processors, configured to switch between threads in the timeslot as the designation in response to the first interrupt signal received by the receiving unit; and a second dispatch unit, which is included in each of the plurality of processors, configured to change the timeslot information in response to the second interrupt signal received by the receiving unit.

Still further, the timeslot switching unit may be configured [i] to prohibit the receiving unit to receive the first interrupt signal and the second interrupt signal during the switching, and [ii] to permit the receiving unit to receive the first interrupt signal and the second interrupt signal immediately after the switching.

With the above structure, the thread switching performed by the first dispatch unit (for example, processing of selecting a thread to be executed next from a plurality of threads allocated to the same timeslot and executing the selected thread) is performed only within a time period allocated to the timeslot. In addition, since changing of the timeslot information performed by the second dispatch unit is performed prior to the thread switching in the timeslot, a time period allocated to the timeslot is not deprived. As a result, the program control device according to the present invention can ensure demanded performance of the thread in the timeslot.

Still further, the second dispatch unit may be configured to add or delete the timeslot information in response to the second interrupt signal.

Still further, the second dispatch unit may be configured to [i] calculate, for each of the plurality of processors, a sum of the allocation times allocated for the timeslots, and [ii] select, based on the sum, a processor to be designated in the timeslot information which is newly added.

Still further, the second dispatch unit may be configured to change the allocation time designated in the timeslot information, in response to the second interrupt signal based on the system call instructing the change of the allocation time.

With the above structure, designation of a processor is not necessary by the program description in a thread. Thereby, it is possible to allocate a new timeslot to an arbitrary processor, and thereby flexibly and dynamically distribute processing performance of each processor. As a result, the program control device according to the present invention can flexibly set processing performance of a whole multi-processor.

Still further, the thread information further may include a priority of the corresponding thread, and the first dispatch unit may be configured to switch a thread to a thread having a highest priority among at least one thread which is allocated to the timeslot as the destination, in response to the first interrupt signal.

Into the timeslot information and the thread information, information regarding which processor a timeslot is allocated to is dynamically recorded. Thereby, in the case where communication between threads is performed for synchronization between threads or mutual exclusion of resources, the scheduling unit can specify a timeslot and a processor to each of which a communication-destination thread is allocated. Therefore, as information necessary for the communication between threads on a thread, only (i) a specifier for specifying a communication-destination thread and (ii) a specifier for specifying an object for communication between threads are necessary. Thus, it is not necessary to check which processor each thread belongs to and which timeslot each thread belongs to. Even if a configuration of a processor and a timeslot is changed, it is not necessary to change a program on the thread. As a result, the program control device according to the present invention can flexibly change a configuration of the system without affecting the program.

It should be noted that the present invention can be realized not only as the above-described program control device having those characteristic units, but also as: a program control method having steps performed by the characteristic units included in the program control device; an OS functioning as the characteristic units included in the program control device; and the like. Obviously, the OS can be distributed via a recording medium such as a Compact Disc-Read Only Memory (CD-ROM) or a communication medium such as the Internet.

The present invention can reduce burdens of program changing resulting from configuration change of a system, while ensuring processing performance of a certain level for each thread.

FURTHER INFORMATION ABOUT TECHNICAL BACKGROUND TO THIS APPLICATION

The disclosure of Japanese Patent Application No. 2007-228258 filed on Sep. 3, 2007 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate a specific embodiment of the present invention. In the Drawings.

DESCRIPTION OF THE PREFERRED EMBODIMENT(S)

[Overall Structure]

Figure 1:
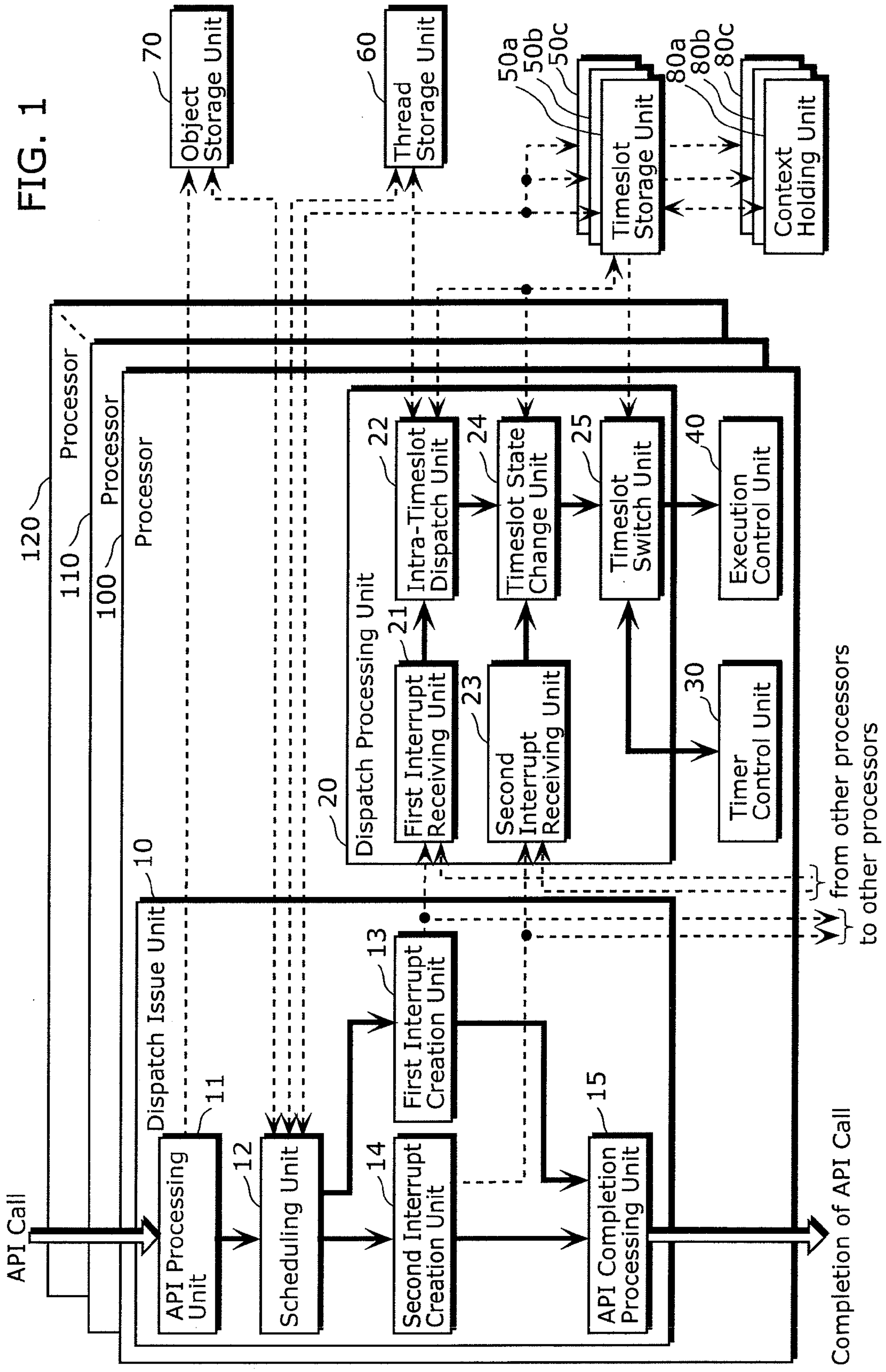
FIG. 1 is a block diagram showing a structure of a main portion of a program control device according to an embodiment of the present invention.

FIG. 1 is a block diagram showing a structure of a main portion of a program control device which switches between threads to be executed for each timeslot, according to a preferred embodiment of the present invention. FIG. 1 schematically shows functions realized by executing software which performs the thread switching as a part of functions of an OS in a processor.

If the processor is a single-processor, hardware configuration of the single-processor is common configuration. If the processor is a multi-processor, hardware configuration of the multi-processor is a common symmetric multi-processor, in which each processor core is connected to access-able memories and is able to invoke an interrupt handler for a different processor core.

This program control device is configured, so that a plurality of threads, for each of which an allocation time is set, are executed by one or more processors, while ensuring demanded performance of each thread.

In this program control device, each processor can create, for all processors, a first interrupt signal which is designated to a certain single time slot as a destination. If the timeslot as the destination is not a current timeslot, the processor for which the first interrupt signal is created does not receive the first interrupt signal. On the other hand, if the timeslot as the destination is the current timeslot, the processor receives the first interrupt signal.

With the above structure, it is possible to prevent that an undesired interrupt process (interrupt handler or the like) is not invoked in a timeslot which is not the destination. In other words, assuming that a timeslot during which a thread is executed is a single virtual processor, if such a virtual processor is not the destination of the first interrupt signal, the virtual processor does not receive the first interrupt signal in the above-described structure. Thereby, performance of the virtual processor which is not the destination is not interfered and deteriorated by the first interrupt signal. As a result, the program control device according to the present embodiment can ensure demanded performance of each thread.

Moreover, the program control device further include: a storage unit in which [i] thread information regarding a thread and [ii] timeslot information regarding a timeslot are stored, [i] the thread information including an identifier of a timeslot to which the thread is allocated, and [ii] the timeslot information including information indicating a thread which is allocated to the timeslot; and a specification unit configured to specify the timeslot as the destination of the first interrupt signal, based on the thread information and the timeslot information, wherein the interrupt creation unit is configured to create the first interrupt signal which designates as the destination the timeslot specified by the specification unit.

With the above structure, the destination of the first interrupt signal is decided based on the thread information and the timeslot information. Thereby, in designing program for each thread, it is not necessary to describe a processor which is to execute the thread nor a communication-destination thread for communication between the threads. As a result, the program control device according to the present embodiment can ensure flexibility of the program designing.

As shown in FIG. 1, the program control device according to the present embodiment includes processors 100, 110, . . . , 120, a thread storage unit 60, and an object storage unit 70. Each of the processors includes a dispatch issue unit 10, a dispatch processing unit 20, a timer control unit 30, an execution control unit 40, a timeslot storage unit 50, and a context holding unit 80. The thread storage unit 60 and the object storage unit 70 are shared by all of the processors.

The dispatch issue unit 10 performs processing of an Application Program Interface (API) which is called by a program described in a thread, and outputs an interrupt to the dispatch processing unit 20, if necessary.

The dispatch processing unit 20 receives the interrupt from the dispatch issue unit 10, and changes information regarding a timeslot (hereinafter, referred to as "timeslot information") and information regarding a thread (hereinafter, referred to as "thread information") according to the received interrupt. In addition, the dispatch processing unit 20 performs round-robin scheduling to allocate each timeslot at least once within a predetermined cycle.

The timer control unit 30 starts counting time, every time an allocation time is set for a timeslot by the dispatch processing unit 20, and then outputs a time-out signal when the counted time reaches the allocation time. The time-out signal is provide to the dispatch processing unit 20 to notify the dispatch processing unit 20 of a timing of switching between timeslots.

The execution control unit 40 executes a thread selected by the dispatch processing unit 20. The execution control unit 40 is a hardware such as a CPU which executes threads.

In the timeslot storage unit 50, the timeslot information is stored for each timeslot.

In the thread storage unit 60, the thread information is stored for each thread.

In the object storage unit 70, information regarding an object (hereinafter, referred to as "object information") is stored for each object. The object information is used when a thread communicates with another thread.

In the context holding unit 80, a context is held for each thread. When execution of a currently executing thread is halted and execution of another thread is resumed, a context of the halted thread is saved into the context holding unit 80 and a context of the resuming thread is restored from the context holding unit 80. Each context includes register information, cache information, and the like, regarding a processor.

[Structure of Dispatch Issue Unit 10]

The dispatch issue unit 10 includes an API processing unit 11, a scheduling unit 12, a first interrupt creation unit 13, a second interrupt creation unit 14, and an API completion processing unit 15.

<API Processing Unit 11>

The API processing unit 11 receives an API call issued by a program executed by a thread, and then performs processing in response to the API call. The API processing unit 11 receives an object as well as the API call, and performs processing regarding the object storage unit 70 corresponding to the object. If it is judged, as a result of the processing, that scheduling is necessary, the API processing unit 11 provides the scheduling unit 12 with notification of the judgment result.

<Scheduling Unit 12>

In receiving the notification from the API processing unit 11, the scheduling unit 12 updates information in the timeslot storage unit 50, the thread storage unit 60, and the object storage unit 70. If, as a result of the updating, information regarding a thread which is allocated to a certain timeslot is updated, the scheduling unit 12 notifies the first interrupt creation unit 13 of the update of the information. If, as a result of the updating, information regarding a timeslot is updated, the scheduling unit 12 notifies the second interrupt creation unit 14 of the update of the information.

<First Interrupt Creation Unit 13>

In receiving the notification from the scheduling unit 12, the first interrupt creation unit 13 creates an interrupt for a processor which has a timeslot to which the thread of the updated information is allocated. The created interrupt is received by a first interrupt receiving unit 21 of the dispatch processing unit 20 in the processor which has the timeslot to which the thread is allocated.

<Second Interrupt Creation Unit 14>

In receiving the notification from the scheduling unit 12, the second interrupt creation unit 14 creates an interrupt for a processor which has the timeslot of the updated information. The created interrupt is received by a second interrupt receiving unit 23 of the dispatch processing unit 20 in the processor which has the timeslot of the updated information.

<API Completion Processing Unit 15>

The API completion processing unit 15 performs post-processing of the API call, after creation of the interrupt by the first interrupt creation unit 13 or the second interrupt creation unit 14. More specifically, the API completion processing unit 15 sends a returned value of the API call, back to the program which has provided the API call.

[Structure of Dispatch Processing Unit 20]

The dispatch processing unit 20 includes the first interrupt receiving unit 21, an intra-timeslot dispatch unit 22, the second interrupt receiving unit 23, a timeslot state change unit 24, and a timeslot switching unit 25. The intra-timeslot dispatch unit 22 is the first dispatch unit in the aspect of the present invention. The timeslot state change unit is the second dispatch unit in the aspect of the present invention.

<First Interrupt Receiving Unit 21>

The first interrupt receiving unit 21 receives the interrupt created by the first interrupt creation unit 13 of the dispatch issue unit 10 in one of the processors 100 to 120. In receiving the interrupt, the first interrupt receiving unit 21 provides the intra-timeslot dispatch unit 22 with notification of the receiving.

<Intra-Timeslot Dispatch Unit 22>

In receiving the notification from the first interrupt receiving unit 21, the intra-timeslot dispatch unit 22 determines a thread to be executed next with reference to the timeslot storage unit 50, and then switches a currently executing thread in a current timeslot to the determined thread. Here, thread information of the determined thread is updated in the thread storage unit 60. If the currently executing thread must not be switched to the determined thread in the current timeslot, the intra-timeslot dispatch unit 22 notifies the timeslot state change unit 24 of that, and then changes a state of the current timeslot. In addition, in the switching between threads, the intra-timeslot dispatch unit 22 saves a context of the halted thread to the context holding unit 80 and restores a context of the resuming thread from the context holding unit 80.

<Second Interrupt Receiving Unit 23>

The second interrupt receiving unit 23 receives the interrupt created by the second interrupt creation unit 14 of the dispatch issue unit 10 in one of the processors 100 to 120. In receiving the interrupt, the second interrupt receiving unit 23 provides the timeslot state change unit 24 with notification of the receiving.

<Timeslot State Change Unit 24>

In receiving the notification from the second interrupt receiving unit 23, the timeslot state change unit 24 sets timeslot information stored in the timeslot storage unit 50 based on the information updated by the scheduling unit 12. During the processing of the timeslot state change unit 24, all interrupt requests and timer switching requests are not received to prevent inconsistency among the timeslot information.

<Timeslot Switching Unit 25>

The timeslot switching unit 25 switches between timeslots, when an execution time period of a thread in a current timeslot reaches an allocation time. By the time-out signal from the timer control unit 30, the timeslot switching unit 25 is notified whether or not the execution time period reaches the allocation time. In receiving the time-out signal, the timeslot switching unit 25 selects timeslot information of a next timeslot. Here, an allocation time for the next timeslot is obtained from the selected timeslot information, and set the obtained allocation time to the timer control unit 30. Thereby, the timer control unit 30 starts counting of the allocation time for the next timeslot. In addition, prior to resuming a thread allocated to the next timeslot, the timeslot switching unit 25 saves a context of a halted thread into the context holding unit 80 and restores a context of the resuming thread from the context holding unit 80. Here, if such timeslot switching becomes necessary when the intra-timeslot dispatch unit 22 is performing its processing, the timeslot switching is performed prior to the processing of the intra-timeslot dispatch unit 22. On the other hand, if timeslot switching becomes necessary when the timeslot state change unit 24 is performing its processing, the timeslot switching is to be halt until the processing of the timeslot state change unit 24 completes.

[Structure of Timeslot Storage Unit 50]

In the timeslot storage unit 50, timeslot information of each timeslot is stored in associated with a corresponding thread. For each thread, an allocation time is set. Each timeslot information is used to create a timeslot which is to be switched.

Figure 2:
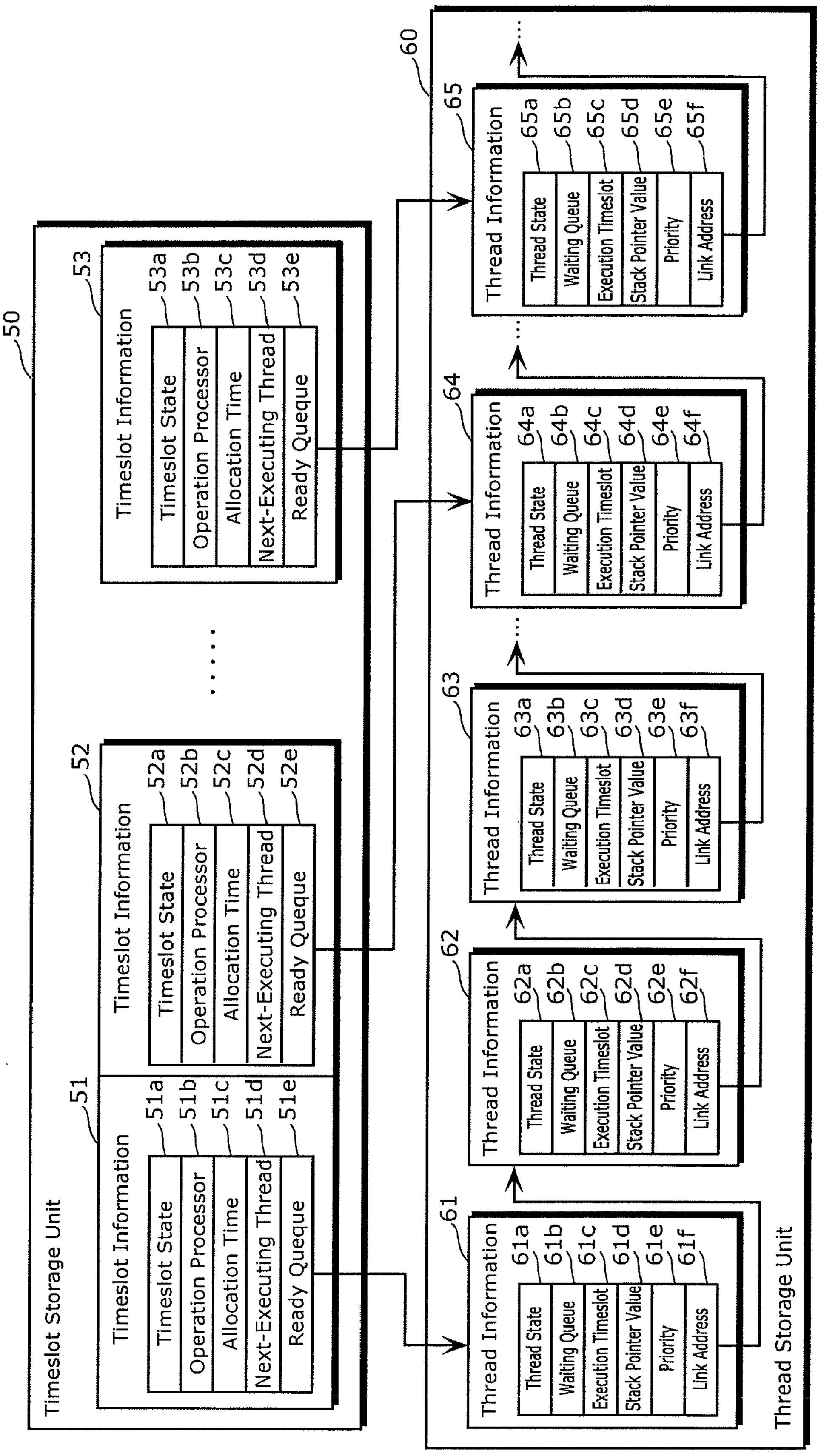
FIG. 2 is a diagram showing an example of timeslot information in a timeslot storage unit and thread information in a thread storage unit.

FIG. 2 is a diagram showing examples of the timeslot information stored in the thread storage unit 50 and the thread information stored in the thread storage unit 60 As shown in FIG. 2, in the timeslot storage unit 50, plural pieces of timeslot information 51, 52, . . . , 53 are stored.

For each timeslot, the timeslot information 51 includes a timeslot state 51*a*, an operation processor 51*b*, an allocation time 51*c*, a next-executing thread 51*d*, and a ready queue 51*e*. The above structure of the timeslot information is the same for every timeslot. The pieces of the timeslot information 51, 52, . . . , 53 form a sequence for each processor. The order of the pieces in the sequence is assumed to be an order of creating the timeslots.

The timeslot state 51*a* is information indicating what kind of state a timeslot of the timeslot information is in. There are three kinds of timeslot states: a valid state, an invalid state, and a halt state. The valid state is a state where the timeslot can be switched to another by the timeslot switching unit 25. When the timeslot information is created, the timeslot state is set to be a valid state. The invalid state is a state where the timeslot must not be switched to another by the timeslot switching unit 25. The halt state is a state where the timeslot waits for a first interrupt. When the first interrupt is received, the halt state is changed to a valid state.

The operation processor 51*b* is information indicating which processor the timeslot of the timeslot information belongs to. When the timeslot information is created, a processor allocated to the timeslot is set as the operation processor 51*b*.

The allocation time 51*c* is information indicating a time period during which the thread associated with the timeslot can be executed. When a time period during which the thread associated with the timeslot has been executed reaches the allocation time, the timeslot is switched to a next timeslot. The allocation time is previously set when the timeslot information is created.

The next-executing thread 51*d* is information used when the intra-timeslot dispatch unit 22 switches between threads. The next-executing thread 51*d* has information regarding a thread to be executed next in the timeslot.

The ready queue 51*e* is information indicating a pointer to thread information of the thread allocated to the timeslot. The ready queue 51*e* is connected to plural pieces of thread information regarding threads which are executable within the timeslot. The scheduling unit 12 selects a candidate for the next-executing thread 54 from the ready queue 51*e*.

[Structure of Thread Storage Unit 60]

In the thread storage unit 60, plural pieces of thread information 61, 62, . . . regarding respective threads allocated to respective timeslots are stored. The thread information is information regarding a thread and used to manage the thread.

Each of the thread information 61, 62, . . . includes a thread state 61*a*, a waiting queue 61*b*, an execution timeslot 61*c*, a stack pointer value 61*d*, a priority 61*e*, and a link address 61*f*.

The thread state 61*a* is information indicating what kind of state the thread of the thread information is in. There are four kinds of thread states: an executing state, an executable state, a wait state, and an exit state.

The executing state is a state where the thread is being executed during an execution time period of a timeslot to which the thread is allocated. The executable state is a state where the thread is not currently executed, but to be selected to be executed as an executing state, when other threads which are allocated to the same timeslot and have priorities higher than a priority of the thread are not executed. The wait state is a sate where the thread is waiting for an object. In the wait state the thread is not selected to be executed as an executing state, but when the object is received, the wait state of the thread is changed to an executable state. The exit state is a state where an exit of the thread is issued and the thread is not resumed, and the thread information of the thread is still in the thread storage unit 60.

The waiting queue 61*b* is information connected to other pieces of thread information regarding threads which are in wait state until the thread is changed to the exit state. When the scheduling unit 12 updates the thread state of the thread from an executing state to an exit state, a candidate for a thread to be changed to an executable state is selected from the waiting queue 61*b*.

The execution timeslot 61*c* is information of a pointer to timeslot information regarding a timeslot to which the thread is allocated.

The stack pointer value 61*d* is information of a stack pointer used for switching the thread. When the thread is switched by the intra-timeslot dispatch unit 22, the pointer value 61*d* indicates a value of the stack pointer at that time.

The priority 61*e* is information indicating a priority that is used as an index for deciding an order of executing the thread among threads allocated to the same timeslot. When the scheduling unit 12 selects a next-executing thread from the ready queue 51*e* connected to the thread information of the thread, the scheduling unit 12 uses the priority 61*e* as an index for the selecting.

The link address 61*f* is information of a pointer to thread information connected by the ready queue 51*e* or the waiting queue 61*b*, when the thread is connected by the ready queue 51*e* or the waiting queue 61*b*.

More specifically, when the thread is in an executing state or an executable state, the link address 61*f* points next-executing thread in the ready queue 51*e*. On the other hand, when the thread is in a wait state, the link address 61*f* points next-executing thread in the waiting queue 61*b*.

[Structure of Object Storage Unit 70]

Figure 3:
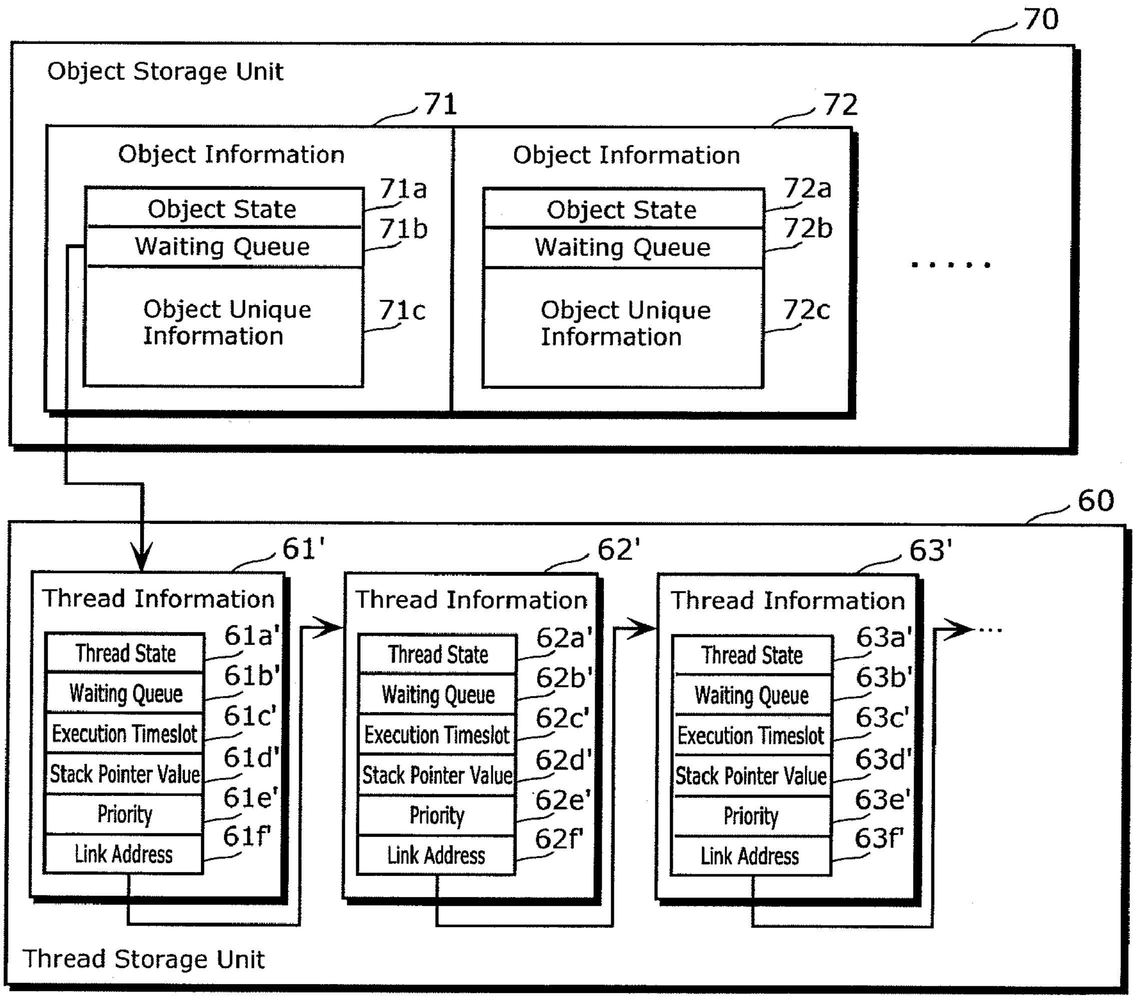
FIG. 3 is a diagram showing object information in an object storage unit and a waiting queue stored in the thread storage unit.

FIG. 3 is a diagram showing object information 71, 72, . . . stored in the object storage unit 70 and the thread information stored in the thread storage unit 60.

Each of the object information 71, 72, . . . includes an object state 71*a*, a waiting queue 71*b*, an object unique information 71*c*.

The object state 71*a* is information indicating what kind of states an object of the object information is in. There are two kinds of object states: a valid state and an invalid state.

The waiting queue 71*b* is information indicating the first thread information in a waiting queue that consists of plural pieces of thread information 61', 62', . . . , regarding threads which are in waiting sate until the object is issued. The plural pieces of thread information 61', 62', . . . , which are connected to the waiting queue 71*b*, form a waiting queue which are sequentially connected by link addresses 61*f'*, 62*f'*, . . . , respectively. When information unique to the object is updated, the scheduling unit 12 selects a candidate for a thread to be executed as an executable state, from the waiting queue 71*b*.

The object unique information 71*c* has information required for the object. The required information differs depending on a kind of the object. The required information is explained in more detail below, for respective different kinds of objects.

[Detailed Processing]

The following describes detailed explanation of processing performed by the program control device according to the embodiment of the present invention. The processing includes thread wait scheduling processing, thread wakeup scheduling processing, thread creation processing, thread exit processing, thread join processing, and timeslot creation/deletion processing. In addition, a mutex, a cond, a flag, and a semaphore are explained as actual application examples of an object.

<Thread Wait Scheduling Processing>

Figure 4:
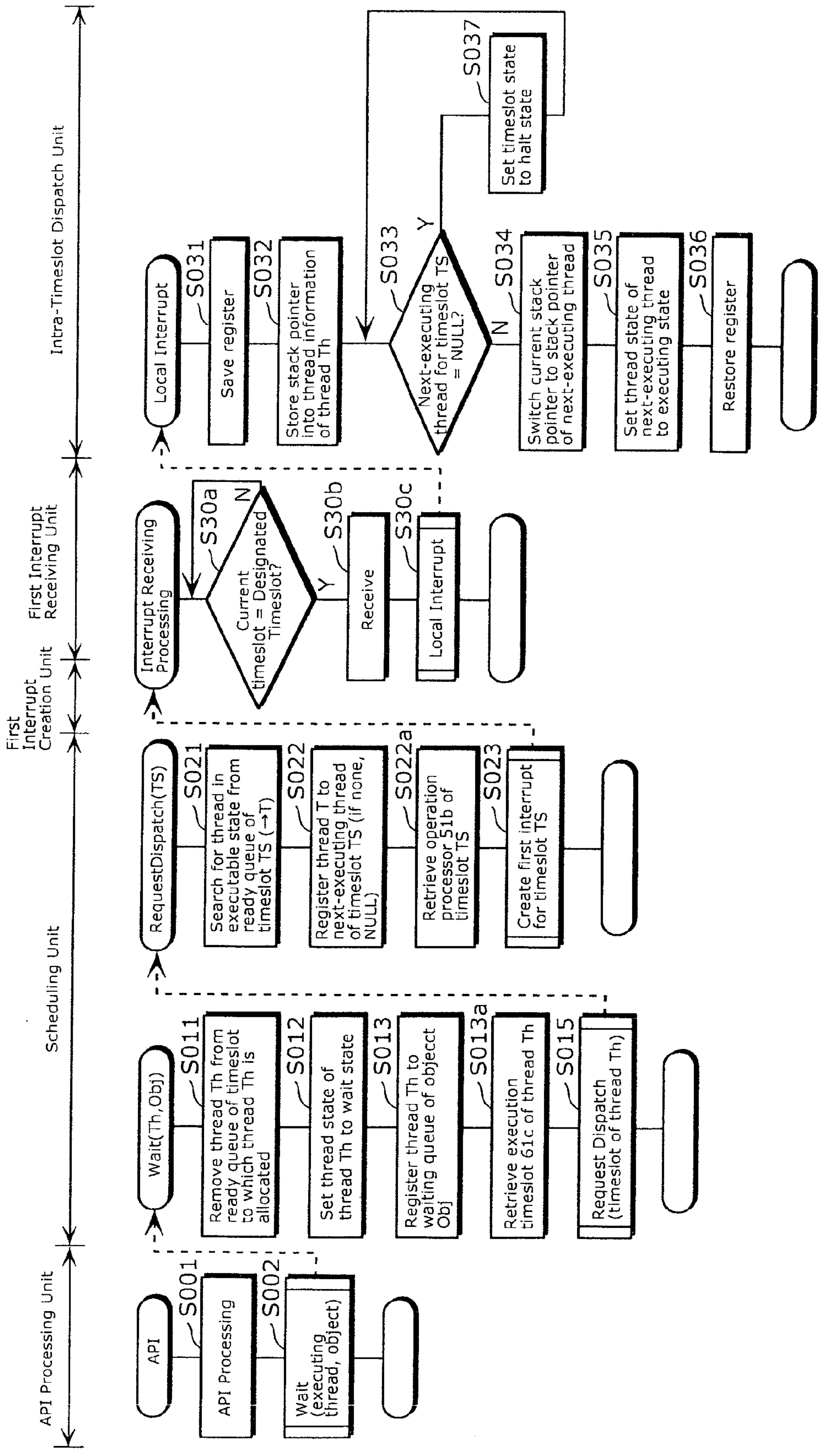
FIG. 4 is a flowchart of thread wait processing in detail.

FIG. 4 is a flowchart of detailed scheduling processing of changing a thread state of a thread to a waiting sate in response to an API call (hereinafter, referred to as "thread wait scheduling processing").

First, the API processing unit 11 performs processing in response to an API call (S001), and calls wait processing "Wait" (Step S002). Here, the API processing unit 11 provides the scheduling unit 12 with an identifier of a currently executing thread Th and an identifier of an object Obj designated by the API call, as arguments for the wait processing "Wait". The identifier of the object "Obj" designated by the API call indicates an object for which the API call is to be performed. An example of the designated object is a mutex, a cond, a flag, a semaphore, or the like. Or, the designated object may be another thread.

Next, the scheduling unit 12 removes thread information of the currently executing thread Th, from a ready queue 51*e* in timeslot information regarding a timeslot in associated with the currently executing thread Th (Step S011). Then the scheduling unit 12 changes a thread state of the thread Th to a wait state (Step S012), then registers the changed thread information of the thread Th to a waiting queue in object information of the object Obj (Step S013), and eventually retrieves an execution timeslot 61*c* from the thread information of the thread Th. In addition, the scheduling unit 12 issues a dispatch request, using the retrieved execution timeslot 61*c* (regarding a timeslot TS) as an argument (Step S105).

As dispatch request processing, threads are tracked from the ready queue of the given timeslot TS via a link address of the thread information, until a thread in an executable state is found (Step S021). The found thread is assumed as a thread T. The thread T is registered as a next-executing thread into the timeslot information regarding the timeslot TS (S022). If such a thread T is not found, NULL (invalid) is registered instead. In addition, an operation processor 51*b* is retrieved from the timeslot information of the timeslot TS. This operation processor 51*b*, which indicates a processor to which the timeslot TS is allocated, is used to designate an interrupt destination of a first interrupt. Finally, the first interrupt creation unit 13 creates a first interrupt for a processor to which the timeslot TS is allocated (Step S023). The first interrupt includes designation of a processor for which the first interrupt is created and designation of the timeslot TS for which the first interrupt is created.

The first interrupt created by the first interrupt creation unit 13 is received by only the designated processor, not by any other processors, and at the same time received by only the designated timeslot, not by any other timeslots (Steps S30*a* and S30*b*). In other words, the first interrupt is received when a current timeslot of the designated processor is the designated timeslot. Then, the receiving of the first interrupt is notified to the intra-timeslot dispatch unit 22. The intra-timeslot dispatch unit 22 actually operates when the designated timeslot is the current timeslot. When the first interrupt is received in the timeslot designated by the first interrupt creation unit 13 of the designated processor, the first interrupt creation unit 13 notifies a local interrupt to the intra-timeslot dispatch unit 22 in the designated processor.

The intra-timeslot dispatch unit 22 temporarily saves the register of the thread Th to a stack (Step S031), and stores a stack pointer of the stack into a stack pointer value 61*d* in the thread information regarding the thread Th (Step S032).

Next, it is determined whether or not any thread is registered as a next-executing thread in the timeslot information of the timeslot TS (Step S033). If a thread as the next-executing thread is registered, a stack pointer value 61*d* is retrieved from thread information of the registered thread, and set as a stack pointer (Step S034). Then, the thread state of the next-executing thread is set to an executable state (Step S035), and register of the next-executing thread is restored from the stack (Step S036). Thereby, after completing the scheduling processing, execution is switched to the next-executing thread.

If no thread is registered as a next-executing thread in the timeslot information of the timeslot TS, in other words, if the next-executing thread is NULL (invalid), this means that there is no more thread to be switched to be executed in the timeslot TS. Therefore, the fact is notified to the timeslot state change unit 24, and the timeslot state change unit 24 sets a timeslot state of the timeslot TS to be a halt state (Step S037). As a result, the timeslot TS is excluded from timeslots to be switched by the timeslot switching unit 25.

It should be noted that, if the timeslot state change unit 24 sets timeslot states of all timeslots to wait state, the processor to which the timeslots are allocated may be switched to a power saving mode. In this case, if at least one timeslot for the processor becomes in a valid state, the power saving mode is cancelled and execution of the timeslot is resumed from Step S033.

<Thread Wakeup Processing>

Figure 5:
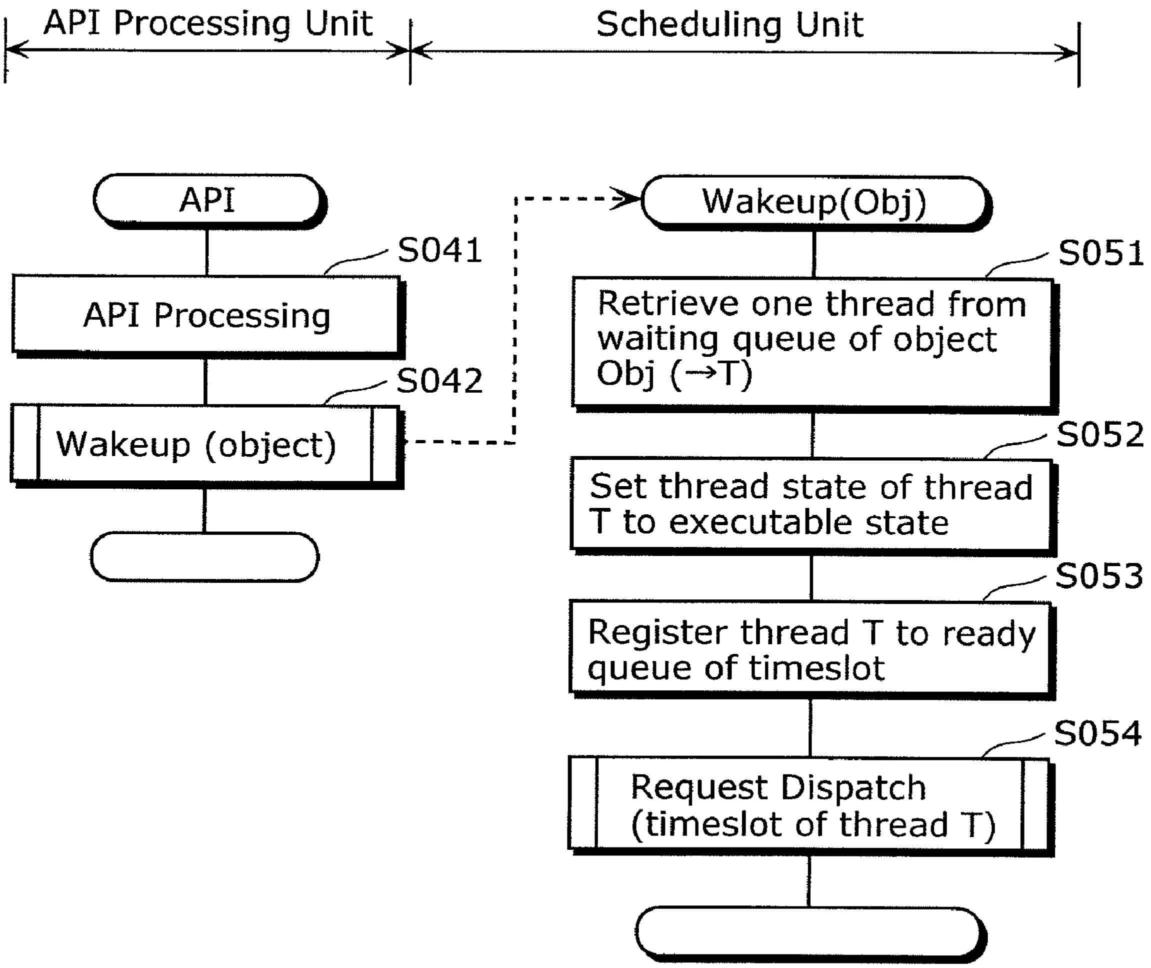
FIG. 5 is a flowchart of thread wakeup processing in detail.

FIG. 5 is a flowchart of detailed scheduling processing of releasing a wait state of a thread in response to an API call (hereinafter, referred to as "thread wakeup processing" or "wakeup processing").

First, the API processing unit 11 performs processing in response to an API call (S041), and calls wakeup processing "Wakeup" (Step S042). For the wakeup processing, an object designated by the API call is provided to the scheduling unit 12.

Next, the scheduling unit 12 retrieves one thread T from a waiting queue in object information regarding the provided object Obj (S051). Then, the scheduling unit 12 changes a thread state in thread information regarding the retrieved thread T to an executable state (Step S052), and registers the changed thread information to a ready queue in timeslot information regarding a timeslot in associated with the thread T (S053). In addition, the scheduling unit 12 issues a dispatch request, using the timeslot in associated with the thread T, as an argument (Step S054).

The dispatch request processing is the same as the dispatch request processing in the thread wait scheduling processing as described previously, so that the dispatch request processing is not explained again herein.

<Thread Creation Processing>

Figure 6:
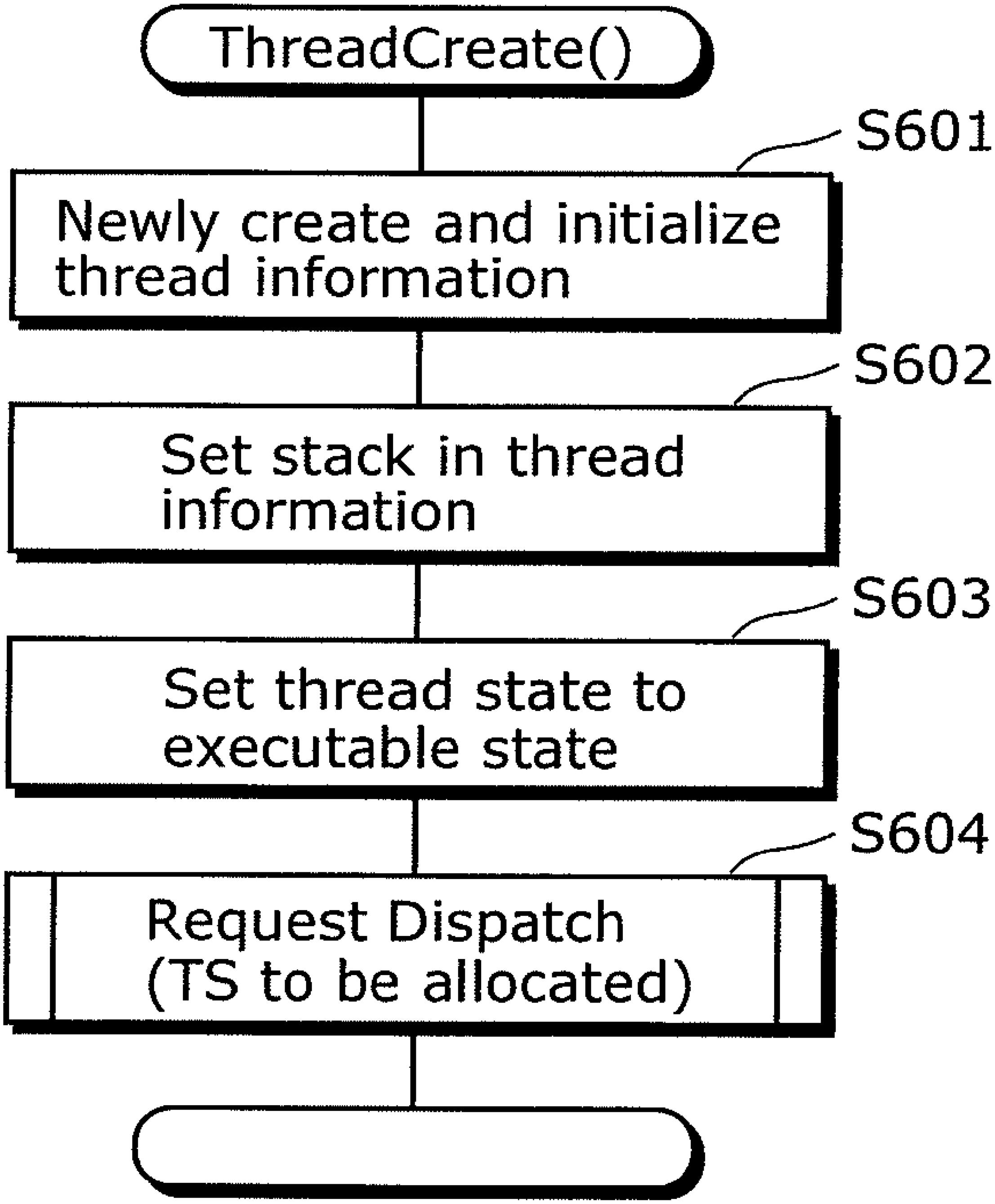
FIG. 6 is a flowchart of thread creation processing (ThreadCreate) in detail.

FIG. 6 is a flowchart of detailed scheduling processing of creating a thread for a timeslot in response to an API call (hereinafter, referred to as "thread creation processing").

First, thread information regarding a thread is newly created in the thread storage unit 60 as processing performed in response to the API call, and initialized based on information provided from the API call (Step S601). Then, invoke information of a thread program is set in a stack used for the thread (Step S602), then a thread state of the thread is set to an executable state (Step S603), and dispatch request processing of the scheduling unit 12 is called for a timeslot to which the thread is allocated. Thereby, register for the dispatch processing is restored, and thereby execution of a program of the thread is resumed.

The dispatch request processing is the same as the dispatch request processing in the thread wait scheduling processing as described previously, so that the dispatch request processing is not explained again herein.

<Thread Exit Processing and Thread Join Processing>

Figure 7A:
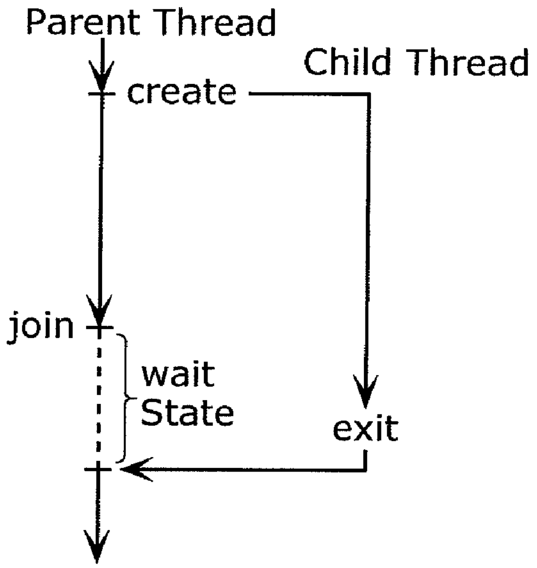
FIG. 7A is a diagram for explaining thread exit processing and thread join processing.
Figure 7B:
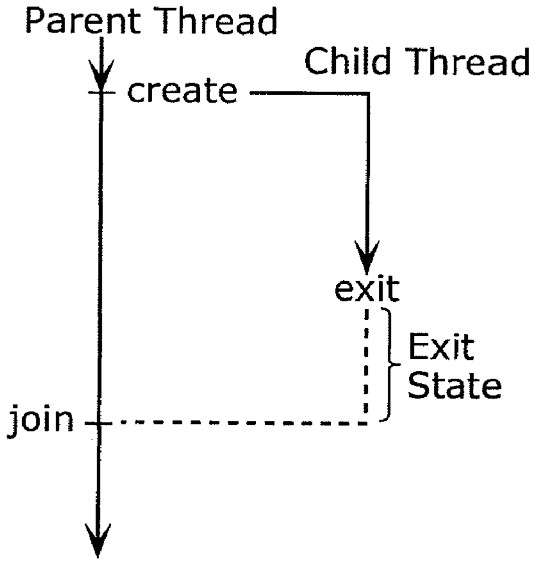
FIG. 7B is a diagram for explaining thread exit processing and thread join processing.

FIG. 7A and FIG. 7B are diagrams for explaining an example of performing processing of exiting execution of a thread (hereinafter, referred to as "thread exit processing") "exit" and processing of waiting for exit of execution of a thread (hereinafter, referred to as "thread join processing") "join", respectively. Each of FIGS. 7A and 7B shows a flow of processing of a thread A (parent thread) and a thread B (child thread). Solid lines show an executing state or an executable state. Broken lines show a wait state or an exit state.

"create" in the figures indicates processing by which the thread A (parent thread) creates the thread B (child thread) (thread creation processing of FIG. 6). "exit" in the figures indicates thread exit processing by which a thread changes its thread state from an executing state (or executable state) to an exit state. The thread join processing "join" is processing by which a thread changes its thread state from an executing sate to an exit state in order to wait until the other thread becomes in an exit state.

In FIG. 7A, the thread A creates the thread B by the thread creation processing "create", and after performing predetermined processing, changes its thread state from an executing state to a wait state so as to be in synchronization with the thread B. Then, when a thread state of the thread B is changed to an exit state by the thread exit processing "exit", the thread A changes its thread state from the wait state to an executing sate, and execution of the thread B exits.

In FIG. 7B, the thread A creates the thread B by thread creation processing "create", and after performing predetermined processing, calls thread join processing "join" using an API call, so as to be in synchronization with the thread B. Prior to the calling of the thread join processing "join" by the thread A, a thread state of the thread B is changed to an exit state by the thread exit processing "exit". In this case, the thread A keeps its executing state by calling the thread join processing "join", and execution of the thread B exits.

Figure 8A:
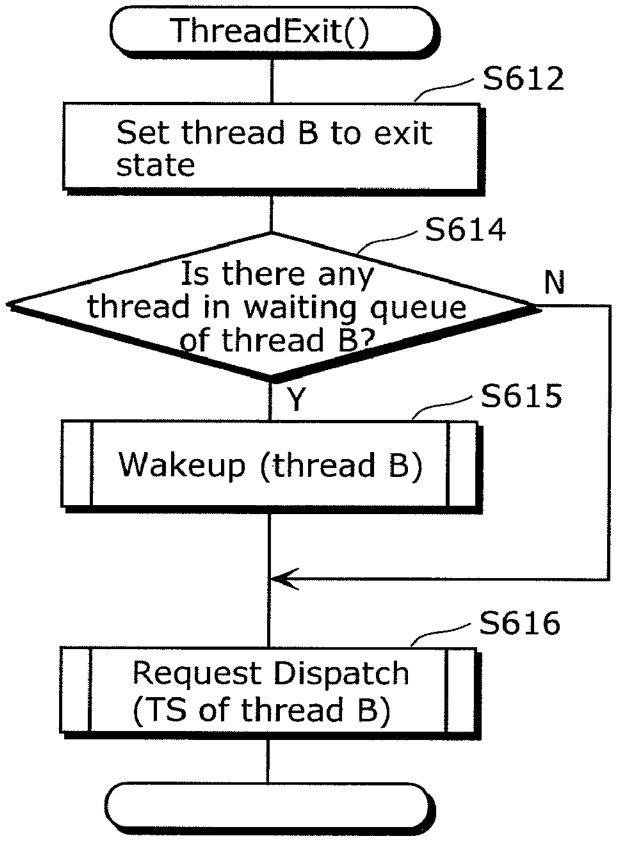
FIG. 8A is a flowchart of thread exit processing (ThreadExit) in detail.

FIG. 8A is a flowchart of detailed scheduling processing of exiting execution of a thread in a timeslot in response to an API call (hereinafter, referred to as "thread exit processing"). In FIG. 8, it is assumed that the thread B in FIGS. 7A and 7B calls the thread exit processing "exit" by the API call.

First, the scheduling unit 12 sets a thread state of the currently executing thread B to an exit state (S612). The scheduling unit 12 determines whether or not any other thread (thread A in this example) is registered in a waiting queue in the thread information regarding the thread B (Step S614). Only when a thread (thread A) is registered, thread wakeup processing "Wakeup" is called (Step S615). By the thread wakeup processing "Wakeup", the wait state of the thread A is changed to an executing state as seen in FIG. 7A. In addition, dispatch request processing of the scheduling unit 12 is called for a timeslot to which the thread B is allocated (Step S616). By the dispatch request processing, the thread information of the thread B is deleted from the thread storage unit 60.

The dispatch request processing is the same as the dispatch request processing in the thread wait scheduling processing as described previously, so that the dispatch request processing is not explained again herein.

<Thread Join Processing>

Figure 8B:
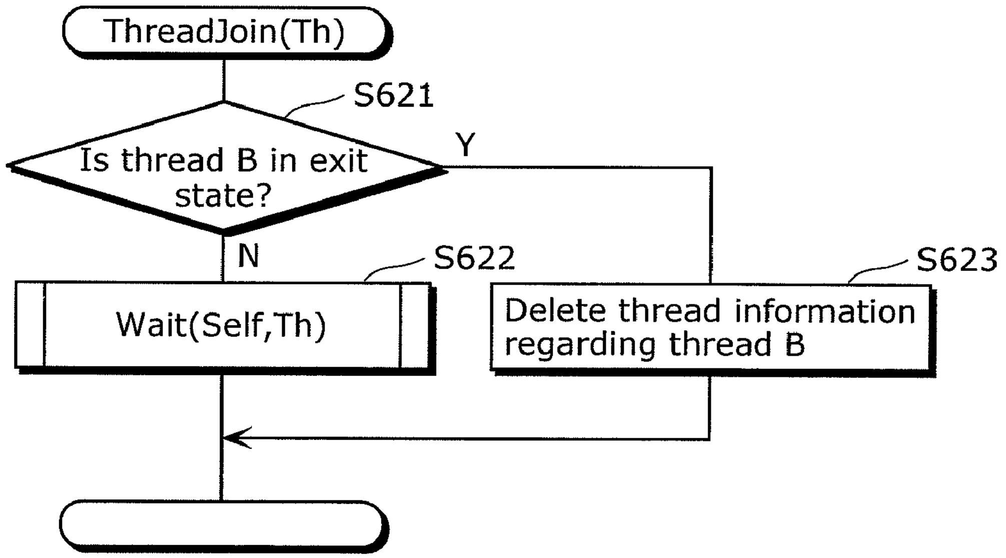
FIG. 8B is a flowchart of thread join processing (ThreadJoin) in detail.

FIG. 8B is a flowchart of detailed scheduling processing of waiting for execution of a thread in a timeslot in response to an API call (thread join processing). In FIG. 7, it is assumed that the thread A in FIGS. 7A and 7B calls the thread join processing "join" by the API call. It is also assumed that a parameter Th designates the thread B that is a child thread of the thread A.

First, the scheduling unit 12 determines whether or not the thread B provided by the API call is in an exit state (Step S621). If the thread B is not in the exit sate, then thread wait processing "wait" is called and the thread A waits until execution of the thread B exits (Step S622). On the other hand, if the thread B is in the exit sate, then the thread information regarding the thread B is deleted from the thread storage unit 60 (Step S623). The thread wait processing "wait" is the same as the thread wait processing in the thread wait scheduling processing as described previously, so that the thread wait processing "wait" is not explained again herein.

<Timeslot Creation/Deletion Processing and Allocation Time Update Processing>

Figure 9:
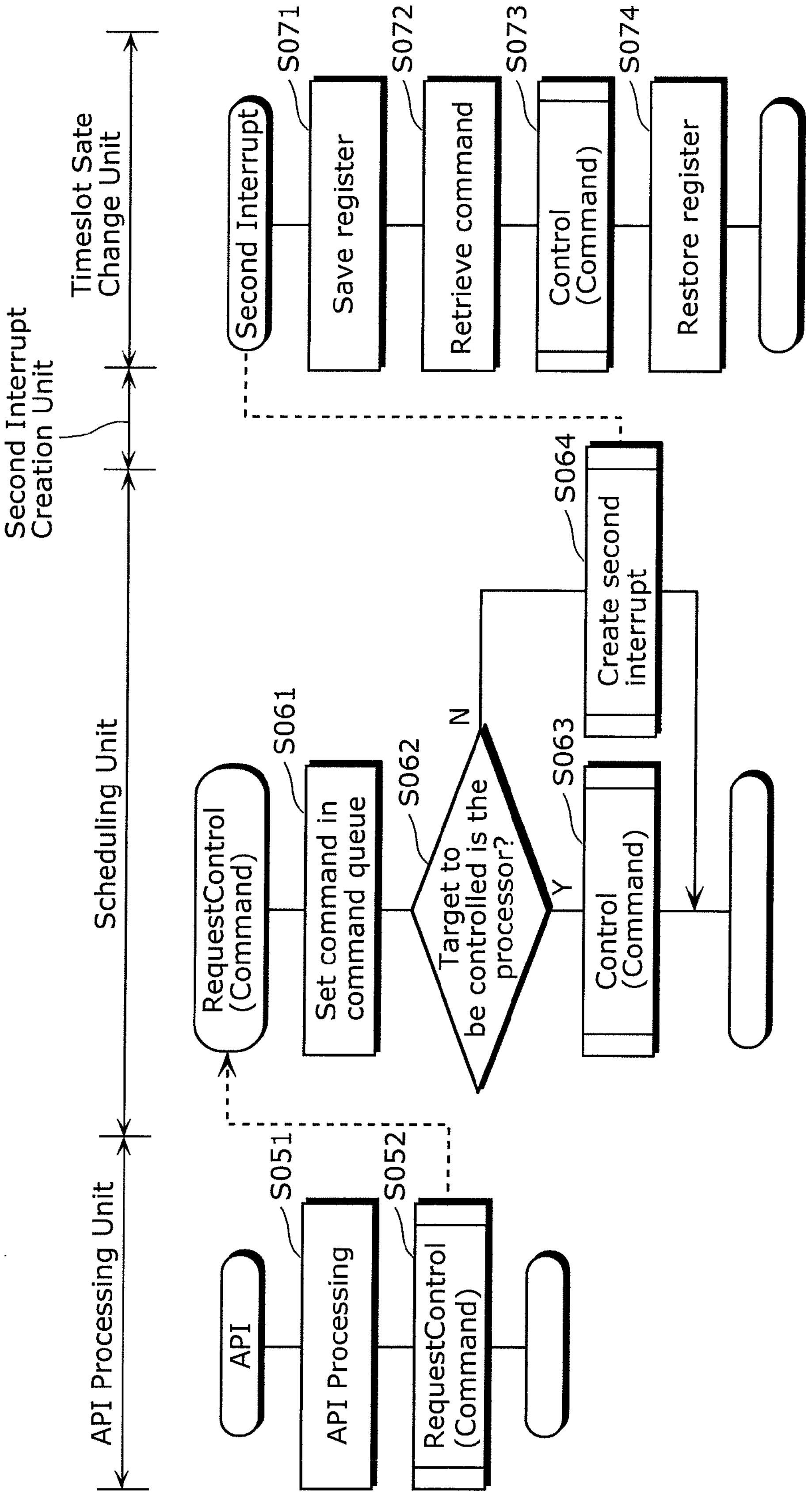
FIG. 9 is a flowchart of timeslot control processing in detail.
Figure 10A:
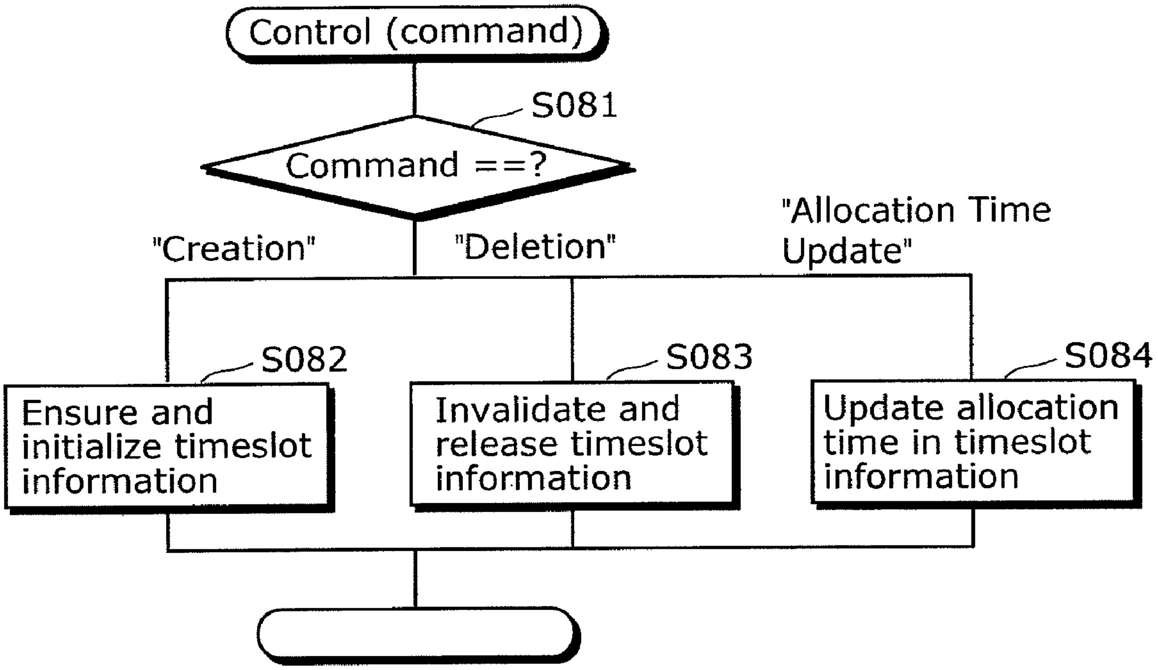
FIG. 10A is a flowchart of command processing in the timeslot control processing in detail.

FIG. 9 and FIG. 10A are flowchart each showing detailed scheduling processing of creating and deleting a timeslot and updating an allocation time in response to an API call.

First, as processing in response to an API call, the API processing unit converts one of information of timeslot creation/deletion and allocation time updating provided from the API call, into a command (Step S051), and provides a command designated by the API call to the scheduling unit 12 for control request processing (Step S052).

Next, the scheduling unit 12 sets the converted command into a command queue (Step S061), and determines whether or not a processor currently performing execution performs the execution in the timeslot (Step S062). If the processor currently performing execution performs the execution in the timeslot, the control processing is directly called (Step S063). On the other hand, if another processor which does not perform any execution currently is to be perform execution in the timeslot, the second interrupt creation unit 14 creates an interrupt and the processor which does not perform any execution currently is notifies of the interrupt (Step S064).

The processor which does not perform any execution currently receives the interrupt from the second interrupt receiving unit 23, and controlling of the processing is passed to the timeslot state change unit 24.

The timeslot state change unit 24 instructs the timeslot switching unit 25 not to switch between timeslots during the processing of the timeslot state change unit 24, in order to prevent inconsistency among timeslot information. This is realized by instructing the processor to perform the creation of an interrupt prior to the switching between timeslots. Then, a register is temporarily saved to a stack (Step S071), and a command is retrieved from a command queue (Step S072). Then, by calling control processing using the retrieved command, content of the timeslot information in the timeslot storage unit 50 is rewritten according to content of the command (Step S073).

In more detail, a kind of the provided command is judged (Step S081), and according to the kind, a timeslot state of the timeslot is changed (creation/deletion) and an allocation time is set (Steps S082, S083, S084).

When the control processing completes, the register is restored from the saving register stack (Step S074), and the scheduling processing completes.

Figure 10B:
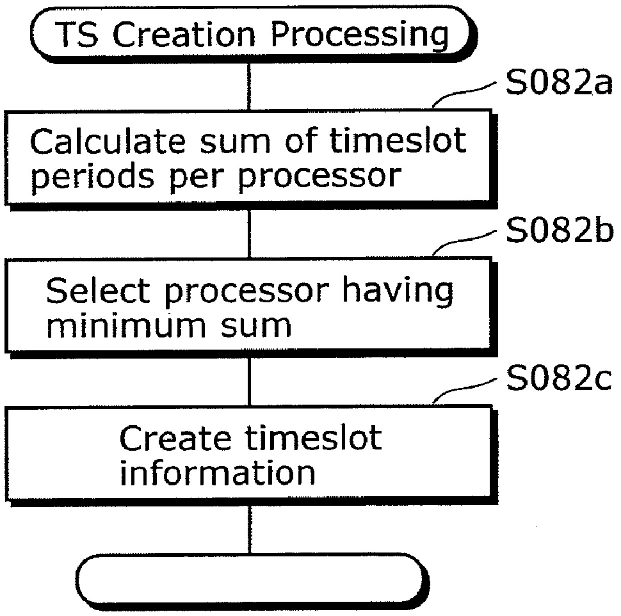
FIG. 10B is a flowchart of one example of timeslot creation processing.

FIG. 10B is a flowchart of an example of the timeslot creation processing at Step S082 of FIG. 10A. In FIG. 10B, the timeslot state change unit 24 calculates a sum of allocation times of all valid time slots which are allocated for each processor (Step S082*a*), the selects a processor with a minimum sum (Step S082*b*), and creates a new timeslot for the selected processor (Step S082*c*). The program control device according to the present embodiment, description in each thread does not depend on a processor, and each thread can be allocated to an arbitrary timeslot of an arbitrary processor. Thereby, as shown in FIG. 10B, loads on a plurality of processors can be equalized among the processors.

It is also possible that, when a timeslot is to be created, the timeslot state change unit 24 previously calculates a sum of setting time periods of timeslots which have already set for a processor, and when a next timeslot is to be created, the scheduling unit 12 compares sums of the timeslot setting time periods among respective processors and thereby decides a processor which will create the next timeslot. For example, as shown in FIG. 10B, loads can be distributed to a plurality of processors. On the other hand, when a whole processing load is small, it is possible to invalidate all timeslot information of a processor thereby setting a power saving mode, so that the load is distributed to processors except the processor.

It is also possible to validate a new decided timeslot, when the second interrupt occurs. The processing of the timeslot state change unit 24 is performed assuming the timeslot is not to be switched, it is possible to perform processing without influence of processing of other timeslots.

<Timeslot Switching Processing>

Figure 11:
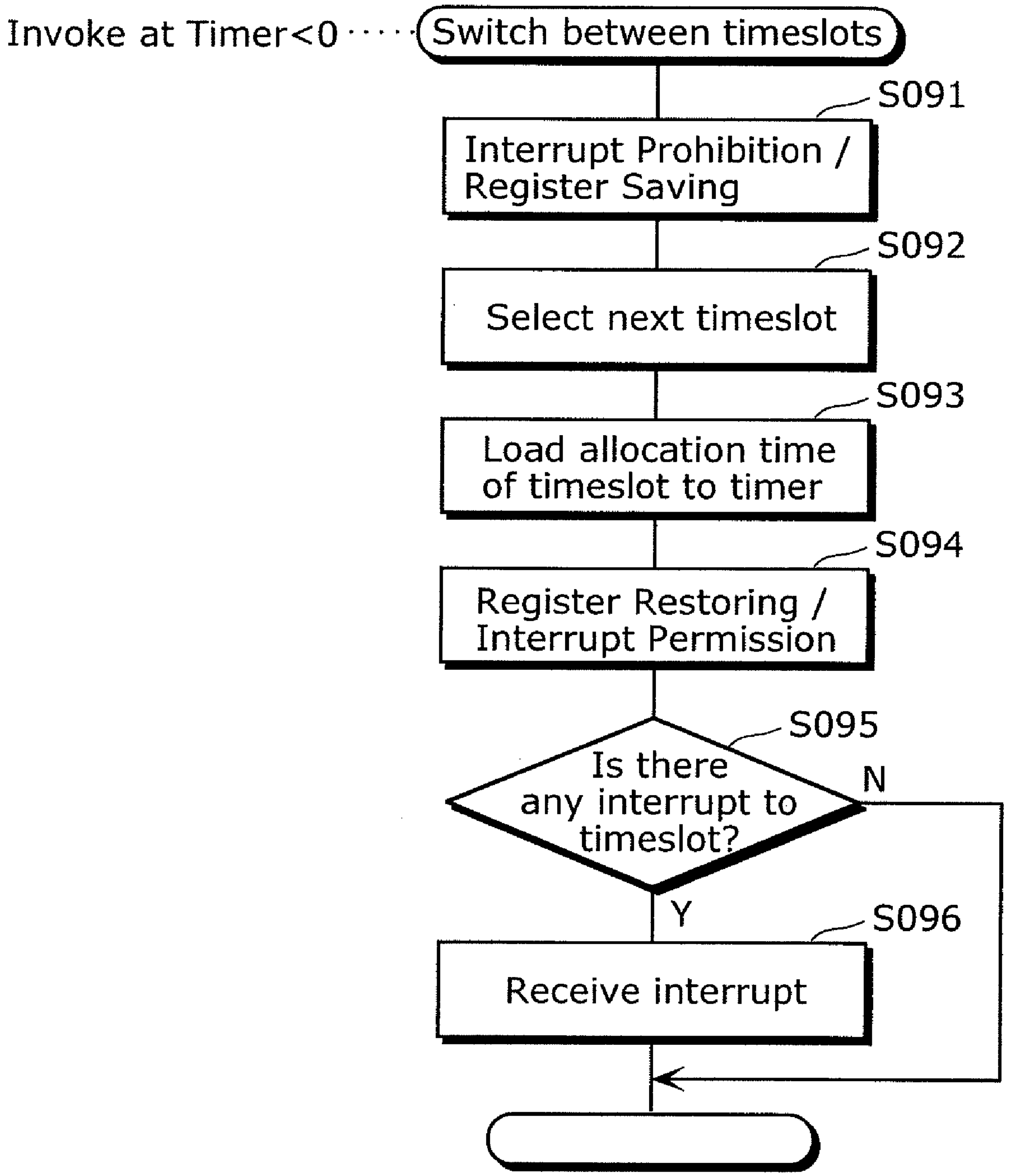
FIG. 11 is a flowchart of timeslot switching processing in detail.

FIG. 11 is a flowchart of detailed scheduling processing of switching a timeslot to be started to another according to a time-out notification of the timer control unit (hereinafter, referred to as "timeslot switching processing").

The timer control unit 30 notifies a time-out notification to the timeslot switching unit 25. The timeslot switching unit 26 saves a context of a current timeslot to the context holding unit 80 (Step S091), and select a next timeslot according to an arrangement order of pieces of timeslot information in the timeslot storage unit (Step S092). Then, allocation information of the next timeslot is retrieved from the timeslot information, and the allocation information is set to the timer control unit 30 (Step S093). Finally, the context is restored from the context holding unit 80, and an interrupt is permitted (Step S094).

By the permission of an interrupt, the first interrupt receiving unit 21 determines whether or not a first interrupt which designates a processor including the first interrupt receiving 21 (hereinafter, referred to as "this processor") and a current timeslot occurs (Step S095). If the first interrupt occurs, the first interrupt receiving unit 21 receives the first interrupt. Thereby, the first interrupt receiving unit 21 can receive the first interrupt whose destination is the timeslot, without receiving first interrupts whose destinations are different timeslots. When the first interrupt is received, the first interrupt creation unit 13 notifies the intra-timeslot dispatch unit 22 in this processor of a local interrupt.

Here, Steps S095 and S096 are the same processing as Steps S30*a* to S30*c* of FIG. 4.

Furthermore, in the processing, even if first and second interrupts occur, they are not received until they are permitted at Step S084. Therefore, it is possible to perform the timeslot switching processing prior to the processing of the intra-timeslot dispatch unit 22.

<Mutex Processing>

A mutex is a function of performing arbitration when two or more threads access one resource (variable or device) in race condition. The mutex includes information for managing a "locked" state and an "unlocked" state of a resource. In the processing for a mutex, there are lock request processing and lock release processing. These functions are set for each resource having a possibility of race condition in which two or more threads access the resource. If a certain thread succeeds in lock processing of a mutex, the mutex becomes in a "locked" state and has to wait until the mutex becomes in an "unlocked" state even if other threads execute lock processing. Thereby, the thread succeeding in the lock processing can occupy a resource to which the thread is allocated. When the thread which has performed lock processing performs unlock processing, other threads can perform lock processing. If a currently executing thread attempts to access a resource, lock processing of a mutex corresponding to the resource needs to be performed, and the thread can access the resource only when the lock processing is success. When the lock processing fails, in other words, when the mutex is in a "locked" state, the thread has to wait until the mutex becomes in a "unlocked" state.

Figure 12:
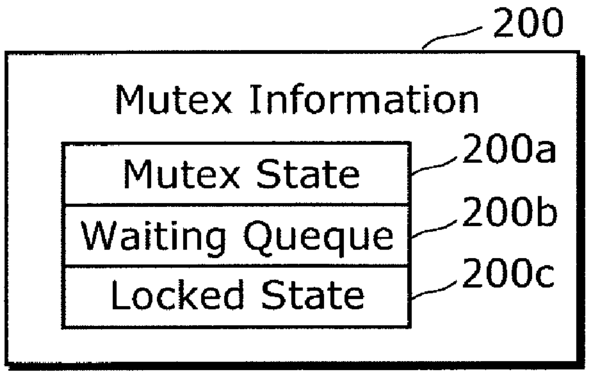
FIG. 12 is a diagram showing an example of mutex information in the object storage unit.

FIG. 12 is a structure of a mutex of object information 71, 72, . . . .

The mutex information 200 includes a mutex state 201, a waiting queue 202, a lock state 203. The mutex information 201 and the waiting queue 202 are the same as the object information, and the lock sate 203 is object unique information 73 in the mutex.

Figure 13:
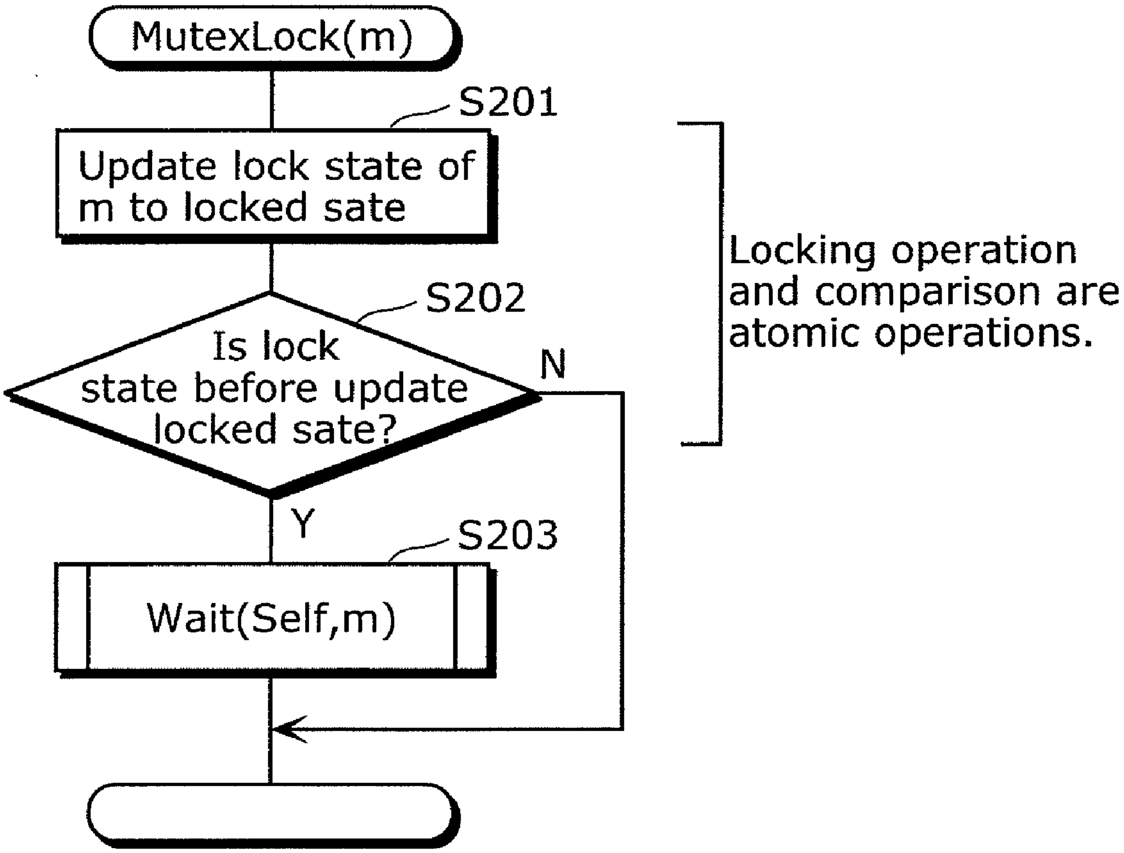
FIG. 13 is a flowchart of mutex lock processing (MutexLock) in detail.
Figure 14:
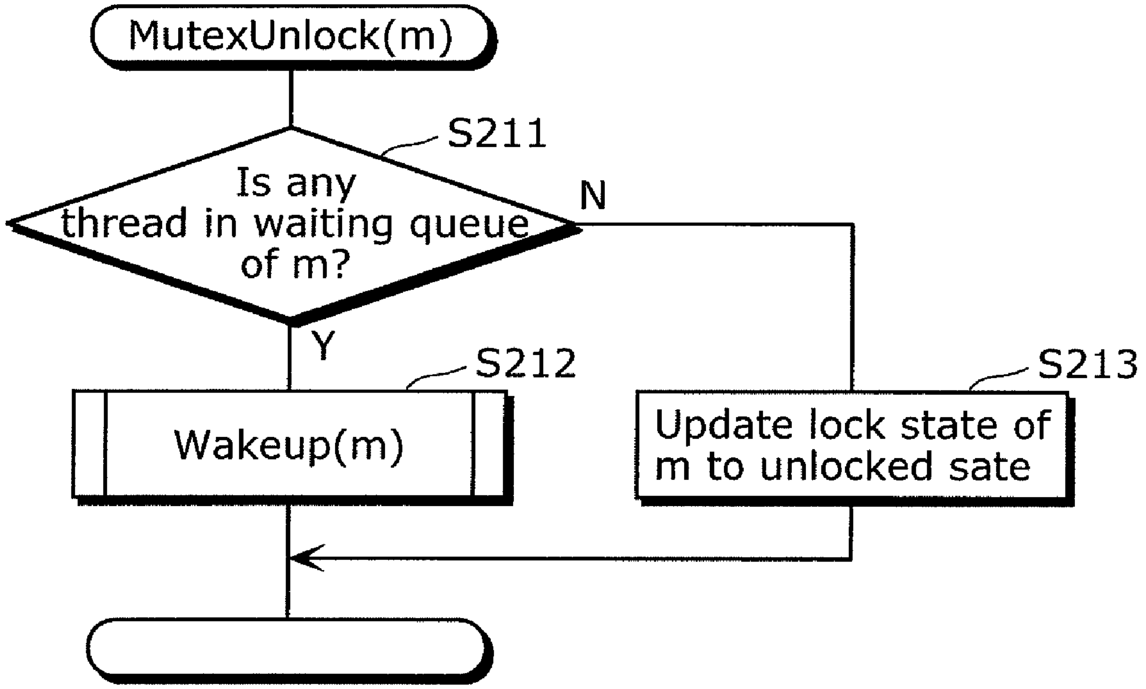
FIG. 14 is a flowchart of mutex unlock processing (MutexUnlock) in detail.

FIG. 13 and FIG. 14 are flowcharts of detailed processing of locking and unlocking a mutex in response to an API call, respectively (hereinafter, referred to as "mutex lock processing" and "mutex unlock processing").

In the mutex lock processing "MutexLock", a lock state of a mutex provided from the API call is updated to a "locked" state, and a determination is made as to whether or not the lock state before the updating is a "locked" state (Steps S201 and S202). The above processes have to be performed indivisibly. If the lock state before the updating is a "locked" state, the wait processing "Wait" is called by an object "mutex". On the other hand, if the lock state before the updating is an "unlocked" state, this means that lock of the mutex is success.

In the mutex unlock processing "MutexUnlock", a determination is made as to whether or not a thread is registered in a waiting queue of the mutex provided from the API call (Step S211). If the thread is registered in the waiting queue, the wakeup processing "Wakeup" is called by the object mutex (Step S212). Here, a thread for which lock of the mutex is success is merely changed, so that the "locked" state is not changed. On the other hand, if the thread is not registered, the lock state of the mutex is updated to be an "unlocked state", and the lock is unlocked (Step S213).

<Cond Processing>

A cond is a function used together with a mutex. When a state of a certain resource is changed, the cond notifies the change to other one or more threads. In order to avoid race condition of resources, a cond needs to be used with a mutex as a pair. This function is set for each resource to which the change is notified. In processing of a cond, there are cond wait processing and cond signal processing.

Figure 15A:
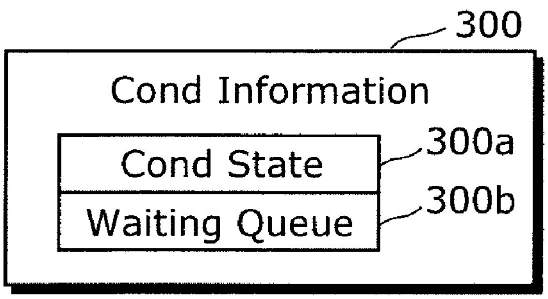
FIG. 15A is a diagram showing an example of cond information in the object storage unit.

FIG. 15A is a structure of a cond of object information 71, 72, . . . .

cond information 200 includes a cond state 201 and a waiting queue 202. The cond state 201 and the waiting queue 202 are the same as the object information, and the cond does not have the object unique information 73.

Figure 15B:
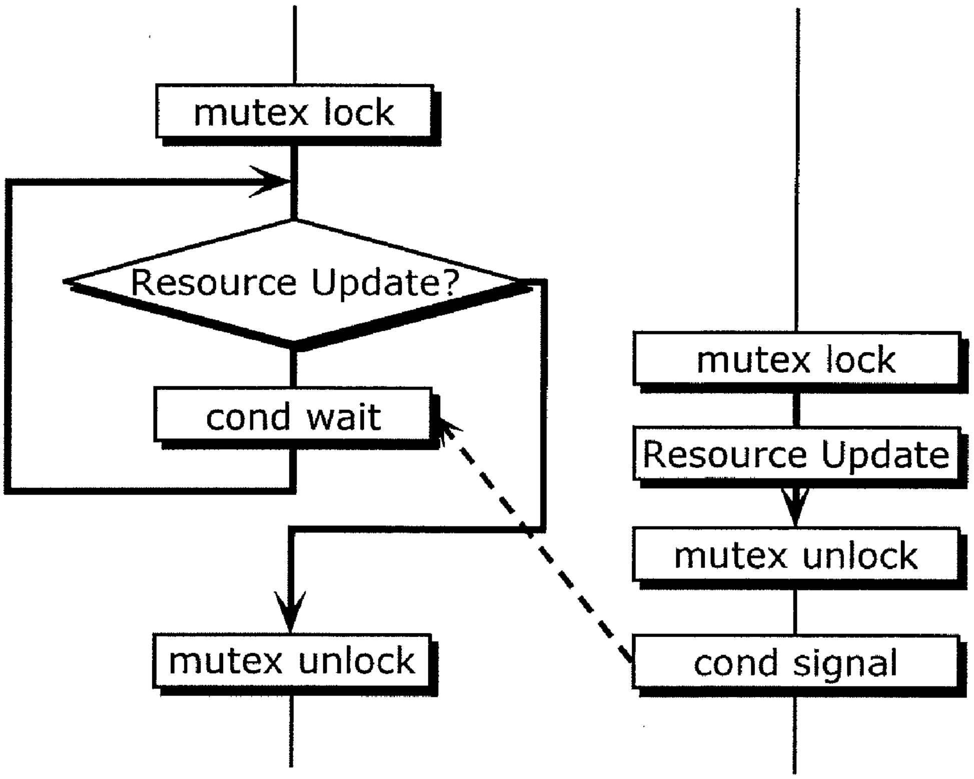
FIG. 15B is a flowchart for explaining processing of cond.

FIG. 15B is a flowchart for explaining processing of a cond. The left part of FIG. 15B is cond wait processing of waiting for a certain resource until other threads are updated. The right part of FIG. 15B is cond signal processing of notifying of change of the resource. A thread to which the cond signal processing has been performed releases a wait state, and proceeds to next processing.

Figure 16:
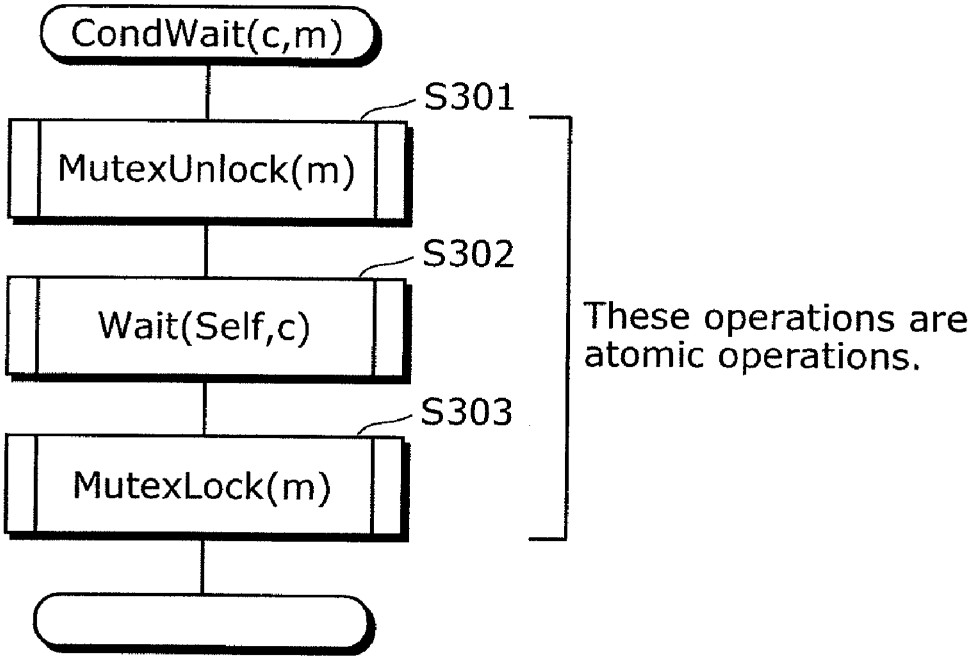
FIG. 16 is a flowchart of cond wait processing (CondWait) in detail.
Figure 17:
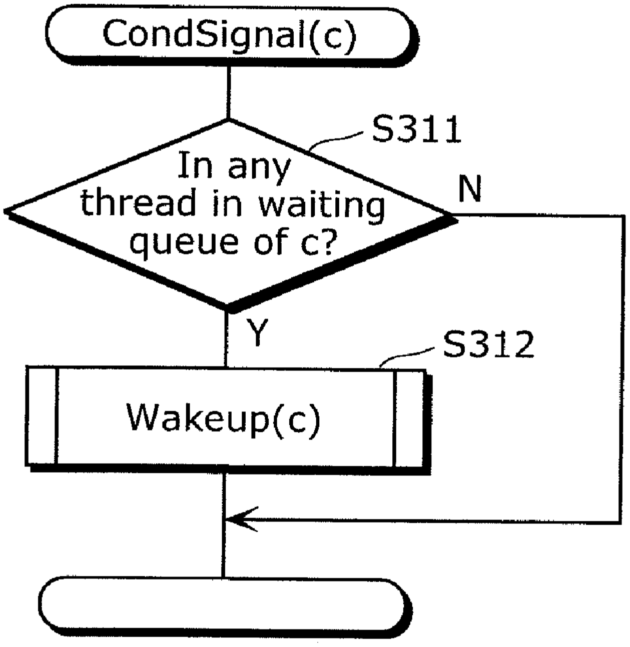
FIG. 17 is a flowchart of cond signal processing (CondSignal) in detail.

FIG. 16 and FIG. 17 are flowcharts of detailed processing of the cond wait processing and the cond wakeup processing in response to an API call.

In the cond wait processing "CondWait", firstly, a mutex provided from the API call is unlocked (Step S301), and wait processing "Wait" is called using the object cond (Step S302). After the thread is restored from the wait state, a mutex is locked again (Step S303).

In the cond signal processing "CondSignal", a determination is made as to whether or not a thread is registered in a waiting queue of a cond provided from the API call. Only if the thread is registered in the waiting queue, the wakeup processing "Wakeup" is called by the object cond (Step S312).

<Flag Processing>

A flag is a function of synchronizing two threads. A flag includes conditions under which the synchronization is performed, and information for managing the synchronization. In processing for a flag, there are flag wait processing, flag set processing, and flag clear processing.

Figure 18:
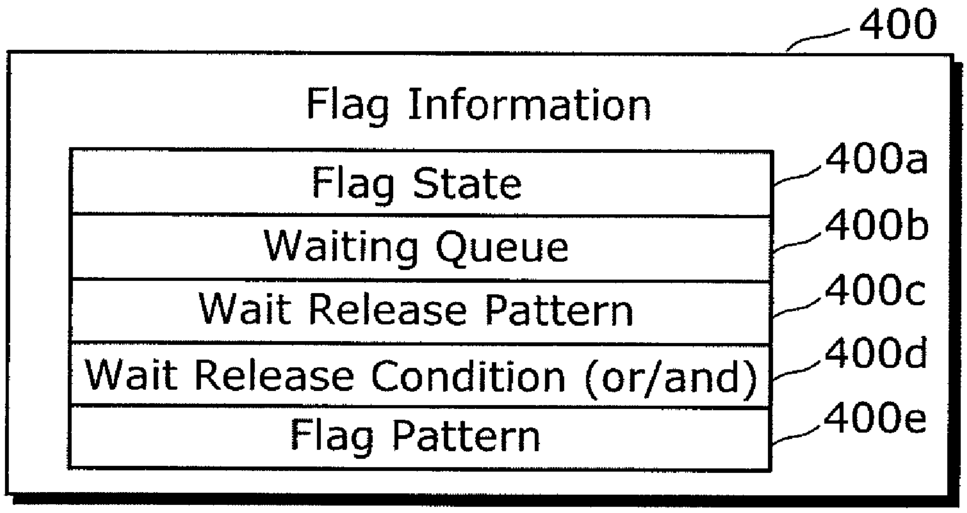
FIG. 18 is a diagram showing an example of flag information in the object storage unit.

FIG. 18 is a structure of a flag of object information 71, 72, . . . .

The flag information 400 includes a flag state 401, a waiting queue 402, a wait release pattern 403, a wait release condition 404, and a flag pattern 405. The flag state 401 and the waiting queue 402 are the same as the object information. The wait release pattern 403, the wait release condition 404, the flag pattern 405 are object unique information 73 of a flag.

Figure 19:
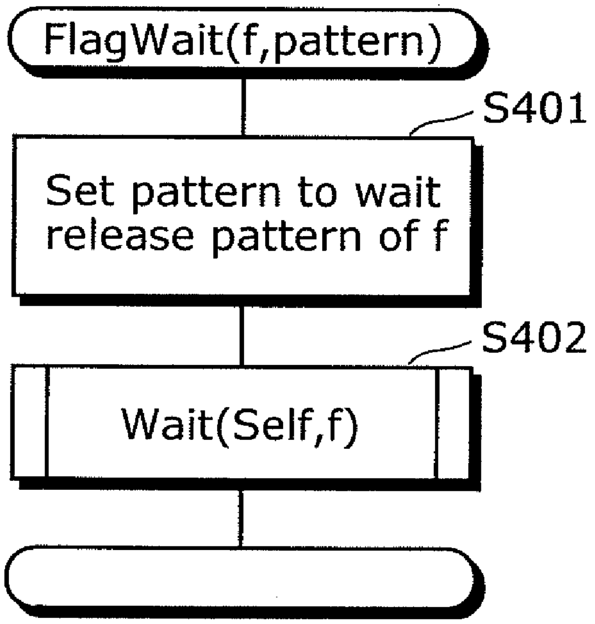
FIG. 19 is a flowchart of flag wait processing (FlagWait) in detail.
Figure 20:
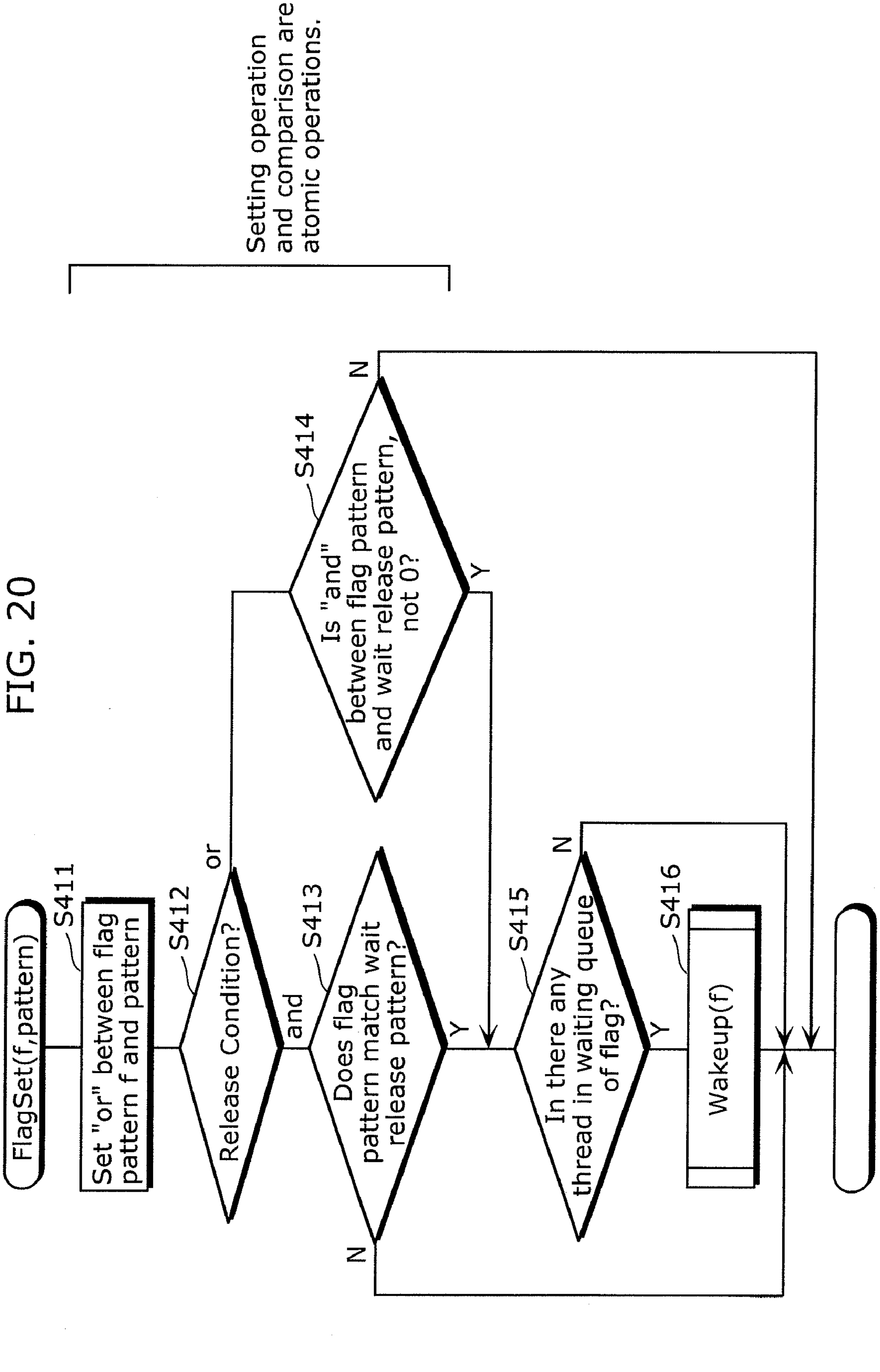
FIG. 20 is a flowchart of flag set processing (FlagSet) in detail.
Figure 21:
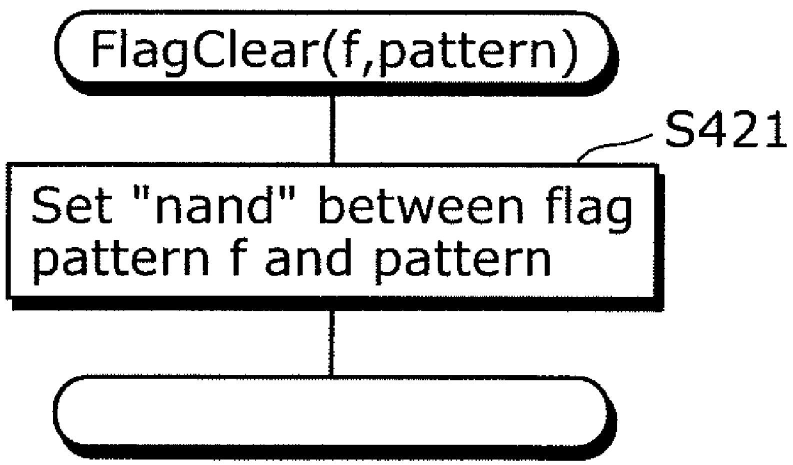
FIG. 21 is a flowchart of flag clear processing (FlagClear) in detail.

FIGS. 19, 20, and 21 are flowcharts of detailed flag wait processing, flag set processing, and flag clear processing, respectively, in response to an API call.

In the flag wait processing "FlagWait", a flag release pattern provided from the API call is set (Step S401), and the wait processing "Wait" is called using the flag (Step S402).

In the flag set processing "FlagSet", a logical addition of (i) a pattern held by the flag provided from the API call and (ii) a pattern provided from the API call is calculated, and the logical addition is stored as the flag pattern (Step S411). The release condition is determined (Step S412), and next processing differs depending on whether the release condition is "OR" or "AND". If the release condition is "AND", only when the flag pattern matches the release pattern, the processing proceeds to a next step (Step S413). On the other hand, if the release condition is "OR", only when a logical addition of the flag pattern and the release pattern is not 0, the processing proceeds to a next step (Step S414). Next, a determination is made as to whether or not a thread is registered in a waiting queue of the flag (Step S415). Only if a thread is registered in the waiting queue, the wakeup processing "Wakeup" is called using the flag (Step S416).

In the flag clear processing "FlagClear", a negative AND of (i) the pattern held by the flag provided from the API call and (ii) the pattern provided from the API call is calculated, and the negative AND is stored as a flag pattern (Step S421).

<Semaphore Processing>

A semaphore is a function of performing arbitration when two or more threads access one or more resources (variables or devices) in race condition. The "semaphore" includes information for managing the number of the resources. In processing for a semaphore, there are semaphore get processing and semaphore release processing.

Figure 22:
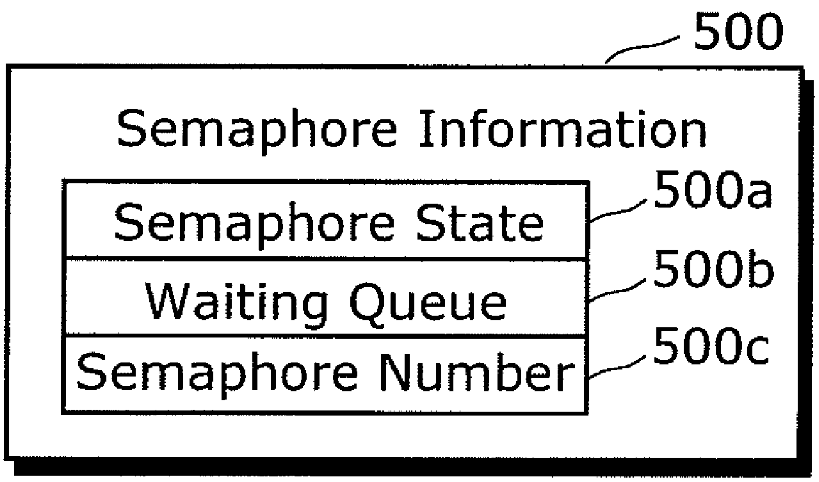
FIG. 22 is a diagram showing an example of semaphore information in the object storage unit.

FIG. 22 is a structure of a semaphore of object information 71, 72, . . . .

The semaphore information 500 includes a semaphore state 501 and a semaphore number 502. The semaphore state 501 and the waiting queue 502 are the same as the object information, and the semaphore number 502 is object unique information 73 of the semaphore.

Figure 23:
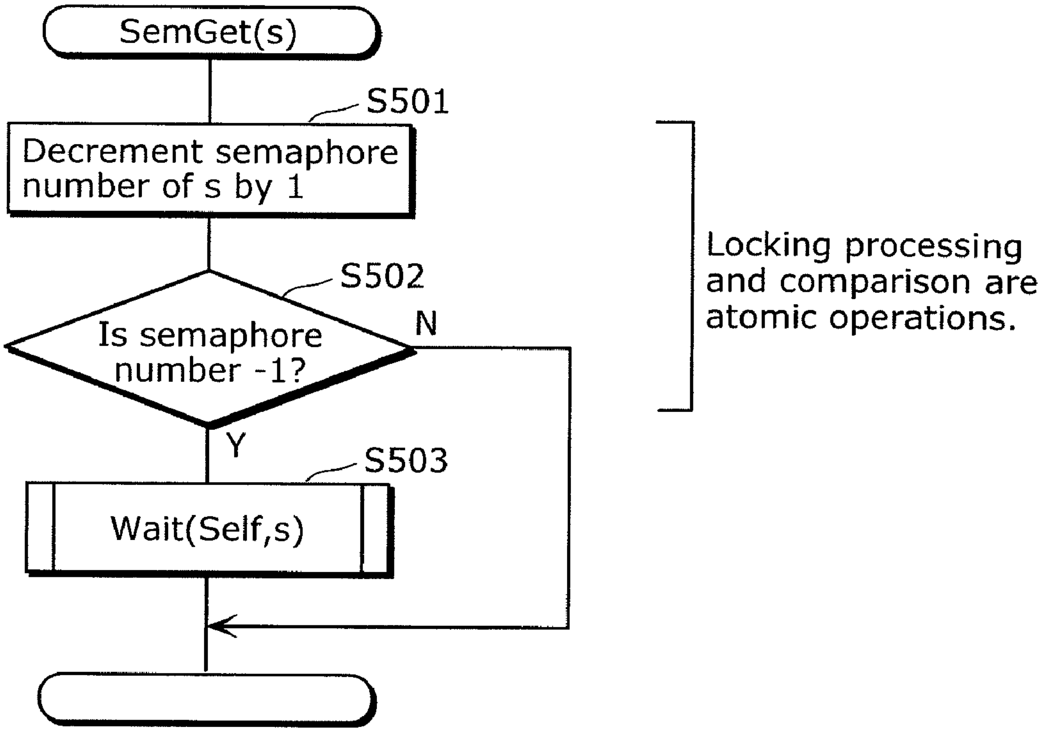
FIG. 23 is a flowchart showing semaphore get processing (SemGet) in detail.
Figure 24:
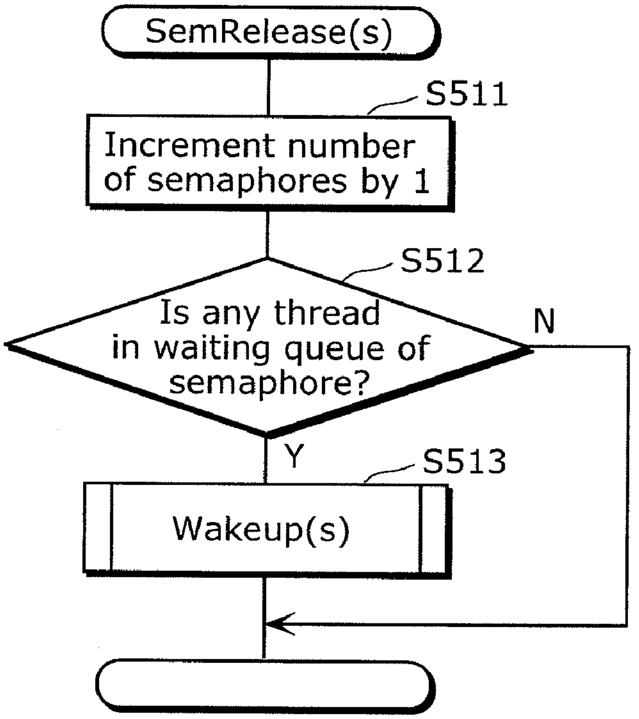
FIG. 24 is a flowchart of semaphore release processing (SemRelease) in detail.

FIG. 23 and FIG. 24 are flowchart of details of the resource request processing and the resource release processing of a semaphore, respectively, in response to an API call.

In the semaphore get processing "SemGet", the number of semaphores provided from the API call is decremented by 1, and a determination is made as to whether or not the resulting number of semaphores is −1 (Steps S501, S502). The above processes have to be performed indivisibly. If the resulting number is −1, then the wait processing "Wait" is called using the semaphore (Step S503). On the other hand, if the resulting number is not −1, this means that one resource has already been got by the semaphore.

In the semaphore release processing "SemRelease", the number of semaphores provided from the API call is incremented by 1 (Step S511), and a determination is made as to whether or not a thread is registered in a waiting queue of the semaphore (Step S512). Only if a thread is registered in the waiting queue, the wakeup processing "Wakeup" is called using the semaphore (Step S513).

Furthermore, using the actual examples of these objects, it is possible to newly realize a communication/synchronization object for two or more threads.

Although only the exemplary embodiment of the present invention has been described in detail above, those skilled in the art will be readily appreciate that many modifications are possible in the exemplary embodiment without materially departing from the novel teachings and advantages of the present invention. Accordingly, all such modifications are intended to be included within the scope of the present invention.

Industrial Applicability

The program control device according to the present invention can satisfy demanded performance of a plurality of threads, and realize description of a program on a thread without depending on a configuration of a processor.

Thereby, processing performance is allocated to a plurality of functions, and the plurality of functions are realized by a plurality of threads. As a result, the program control device according to the present invention can easily design a program for ensuring processing performance and provide flexibility to the program designing.

The program control device according to the present invention is suitable for a device which performs a various audio/visual processing simultaneously in parallel in real time, or development circumstances and the like of such a device.

What is claimed is:

1. A program control device which switches, per timeslot, between threads to be executed, said program control device comprising:

a plurality of processors;

an interrupt creator configured to cause a first processor to create a first interrupt signal that contains information which designates, as a destination, timeslot assigned to one of the first processor and a second processor, the first processor and the second processor being included in the plurality of processors, the second processor being different than the first processor;

a receiver configured to control one of the first processor and the second processor assigned with the timeslot designated as the destination, in the information contained in the first interrupt signal, not to receive the first interrupt signal if the timeslot designated as the destination in the information is not a current timeslot and to receive the first interrupt signal if the timeslot is the current timeslot;

a storage in which thread information regarding a thread and timeslot information regarding a timeslot are stored, the thread information including an identifier of a timeslot to which the thread is allocated, and the timeslot information including information indicating a thread which is allocated to the timeslot;

a specifier configured to specify the timeslot as the destination of the first interrupt signal, based on the thread information and the timeslot information, wherein said interrupt creator is configured to create the first interrupt signal which designates, as the destination, the timeslot specified by said specifier;

a receive processor configured to receive a system call from a current thread which is being executed in the current timeslot;

a scheduler configured to change one of a state of a thread and a state of a timeslot in response to the system call, the thread and the timeslot being included among threads and timeslots including the current thread and the current timeslot, respectively, a first dispatcher configured to switch between threads to be executed in the timeslot as the destination, in response to the first interrupt signal received by said receiver; and a second dispatcher configured to change the timeslot information regarding a thread in response to the second interrupt signal received by said receiver, the thread being included among threads including the thread relating to the change;

wherein said interrupt creator is configured:

when said scheduler changes the state of the thread, to create the first interrupt signal which designates, as the destination, a timeslot to which a thread relating to the change is allowed, the thread relating to the change being included among threads including the thread with the state being changed by said scheduler, when said scheduler changes the state of the timeslot, to create a second interrupt signal.

2. The program control device according to claim 1, further comprising a timeslot switcher configured to switch a timeslot to another timeslot, based on an allocation time allocated for the timeslot, wherein said timeslot switcher is configured to prohibit said receiver from receiving the first interrupt signal and the second interrupt signal during the switching, and permit said receiver to receive the first interrupt signal and the second interrupt signal immediately after the switching.

3. The program control device according to claim 1, wherein said program control device is included in a multiprocessor including said processor group, said interrupt creator is configured to create the first interrupt signal which designates one of the plurality of processors and the timeslot as the destination, and said receiver is configured not to receive the first interrupt signal from the processor that is not the processor designated in the first interrupt signal, and to receive the first interrupt signal from the processor that is the processor designated in the first interrupt signal.

4. A program control device which switches, per timeslot, between threads to be executed, said program control device comprising:

a plurality of processors;

an interrupt creator configured to cause a first processor to create a first interrupt signal that contains information which designates, as a destination, a timeslot assigned to one of the first processor and a second processor, the first processor and the second processor being included in the plurality of processors, the second processor being different than the first processor;

a receiver configured to control one of the first processor and the second processor assigned with the timeslot designated as the destination in the information contained in the first interrupt signal, not to receive the first interrupt signal if the timeslot designated as the destination in the information is not a current timeslot and to receive the first interrupt signal if the timeslot is the current timeslot;

wherein said program control device is included in a multiprocessor including said plurality of processors, said interrupt creator, which is provided for each of the plurality of processors, is configured to create the first interrupt signal which designates one of the plurality of processors and the timeslot as the destination, and said receiver, which is provided for each of the plurality of processors, is configured not to receive the first interrupt signal, if the processor for which said receiver is provided is not the processor designated in the first interrupt signal, and to receive the first interrupt signal, if the processor for which said receiver is provided is the processor designated in the first interrupt signal, said program control device further comprises:

a thread information storage in which thread information for each thread is stored, the thread information including a state of a corresponding thread and an identifier of a timeslot to which the corresponding thread is allocated;

a timeslot information storage in which timeslot information for each timeslot is stored, the timeslot information including an allocation time allocated for a corresponding timeslot, information designating a thread allocated to the corresponding timeslot, and an identifier of a processor to which the corresponding timeslot is allocated;

a receive processor, which is included in each of the plurality of processors, and is configured to receive a system call from a current thread which is being executed in the current timeslot; and a scheduler, which is included in each of the plurality of processors, and is configured to change one of the thread information and the timeslot information, in response to the system call received by said receiver, wherein said interrupt creator includes:

a first interrupt creator, which is included in each of the plurality of processors, and is configured to create the first interrupt signal which designates a processor as a processor destination and the timeslot as the destination, when said scheduler in the processor including said first interrupt creator changes the thread information, and a second interrupt creator, which is included in each of the plurality of processors, configured to create a second interrupt signal which designates a processor as a processor designation, when said scheduler in the processor including said second interrupt creator changes the timeslot information.

5. The program control device according to claim 4, wherein said scheduler is configured to specify a processor and a timeslot to each of which a thread with the thread information being changed by said scheduler is allocated, based on the identifier of the timeslot and the identifier of the processor, and said first interrupt creator is configured to create the first interrupt signal which designates the processor specified by said scheduler as the processor designation and the timeslot specified by said scheduler as the designation.

6. The program control device according to claim 4, wherein said receiver is configured not to receive the second interrupt signal, if the processor including said receiver is not the processor designated in the second interrupt signal, and to receive the second interrupt signal in a certain timeslot in each of the plurality of processors.

7. The program control device according to claim 4, further comprising:

a timeslot switcher, which is included in each of the plurality of processors, and is configured to switch a timeslot to another timeslot, based on an allocation time allocated for the timeslot;

a first dispatcher, which is included in each of the plurality of processors, and is configured to switch between threads in the timeslot as the designation in response to the first interrupt signal received by said receiver; and a second dispatcher, which is included in each of the plurality of processors, and is configured to change the timeslot information in response to the second interrupt signal received by said receiver.

8. The program control device according to claim 7, wherein said timeslot switcher is configured to prohibit said receiver from receiving the first interrupt signal and the second interrupt signal during the switching, and to permit said receiver to receive the first interrupt signal and the second interrupt signal immediately after the switching.

9. The program control device according to claim 7, wherein said second dispatcher is configured to add or delete the timeslot information in response to the second interrupt signal.

10. The program control device according to claim 7, wherein said second dispatcher is configured to calculate, for each of the plurality of processors, a sum of the allocation times allocated for the timeslots, and to select, based on the sum, a processor to be designated in the timeslot information which is newly added.

11. The program control device according to claim 7, wherein said second dispatcher is configured to change the allocation time designated in the timeslot information, in response to the second interrupt signal based on the system call instructing the change of the allocation time.

12. The program control device according to claim 7, wherein the thread information further includes a priority of the corresponding thread, and said first dispatcher is configured to switch a thread to a thread having a highest priority among at least one thread which is allocated to the timeslot as the destination, in response to the first interrupt signal.

13. The program control device according to claim 7, wherein said timeslot switcher is configured to switch the timeslot to a further next timeslot according to the timeslot information regarding the further next timeslot, when the timeslot information regarding a next timeslot is invalid, the next timeslot following the timeslot and the further next timeslot following the next timeslot.

14. The program control device according to claim 7, wherein said first dispatcher is configured, when there is no executable thread among threads allocated to the timeslot as the designation, to invalidate the timeslot information until an executable thread is set in the timeslot information.

15. The program control device according to claim 7, wherein said timeslot switcher is configured to set the processor including said timeslot switcher to a power saving mode, when all timeslot information regarding all timeslots of the processor are invalid.

16. The program control device according to claim 7, further comprising an object storage in which object information is stored for each object used in communication between threads, the object information indicating that an object state of the each object is a first state or a second state, wherein said receive processor is configured to change the object state designated in the object information from the first state to the second state, or from the second state to the first state, in response to the system call, said scheduler is configured to change a thread state of a current thread which is currently being executed, from an executable state to a wait state, when the current thread attempts to access an object in the first state, and to select at least one thread in a wait state and to change the wait state of the selected thread to an executable state, when the object state of the object is changed to the second state, and said thread switcher is configured to exclude a thread in a wait state from the threads to be switched.

17. The program control device according to claim 16, wherein the object is associated with a resource, and arbitrates a race condition of a plurality of threads accessing the resource, said receive processor is configured to change the object state designated in the object information regarding the object in association with the resource to the first state, when the system call indicates that the resource is obtained, and to change the object state designated in the object information of the object in association with the resource to the second state, when the system call indicates that the resource is released, said first interrupt creator included in the processor including said receive processor is configured to create the first interrupt signal whose parameter is the object information, when the object state designated in the object information is changed, and said first dispatcher is further configured to switch threads in response to the first interrupt signal whose parameter is the object information.

18. The program control device according to claim 16, wherein the object is associated with a resource, and when a resource state of the resource is changed, notifies the change to an other thread, and said receive processor is configured to change the object state designated in the object information regarding the object in association with the resource to the first state, when the system call indicates that the current thread waits for the change of the resource, and to change the object state designated in the object information regarding the object in association with the resource to the second state, when the system call indicates that the current thread notifies the other thread of the change of the resource.

19. The program control device according to claim 16, wherein the object manages a condition and a state under which two threads are in synchronization with each other, using a variable, and said receive processor is configured to change the object state designated in the object information regarding the object in association with the variable to the first state, when the system call indicates the current thread waits until the variable satisfies the condition, and to change the object state designated in the object information regarding the object in association with the variable to the second state, when the system call indicates that the variable satisfies the condition.

20. The program control device according to claim 7, wherein the object arbitrates a race condition of at least two threads accessing at least one resource, the object information regarding the object includes the number of resources which can be accessed by any one of the threads, and said receive processor is configured to decrement the number of resources, when the system call indicates that the resource is obtained by the other thread, change the object state designated in the object information regarding the object in association with the resource to the first object, when the decremented number of resources reaches a predetermined value, and to increment the number of resources and to change the object state designated in the object information to the second state, when the system call indicates that the resource is to be released.

21. The program control device according to claim 7, wherein said scheduler is configured to change the thread state of a first thread to an exit state, in response to the system call including an instruction to exit the first thread, to select at least one thread in a wait state and change the wait state of the selected thread to an executable state, when the thread state of the first thread is changed to the exit state, and to change a thread state of a second thread to a wait state, in response to the system call including an instruction to wait for completing the second thread, and said first dispatcher is configured to exclude a thread in the wait state from the thread to be switched.

* * * * *